United States Patent
Park et al.

(10) Patent No.: US 11,350,183 B2
(45) Date of Patent: May 31, 2022

(54) SIGNAL TRANSMITTING DEVICE, SIGNAL RECEIVING DEVICE, SIGNAL TRANSMITTING METHOD, AND SIGNAL RECEIVING METHOD

(71) Applicant: LG ELECTRONICS INC., Seoul (KR)

(72) Inventors: Jonghwan Park, Seoul (KR); Minsung Kwak, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/969,368

(22) PCT Filed: Mar. 11, 2019

(86) PCT No.: PCT/KR2019/002786
§ 371 (c)(1),
(2) Date: Aug. 12, 2020

(87) PCT Pub. No.: WO2019/172726
PCT Pub. Date: Sep. 12, 2019

(65) Prior Publication Data
US 2020/0404395 A1    Dec. 24, 2020

(30) Foreign Application Priority Data

Mar. 9, 2018   (KR) .................. 10-2018-0027861

(51) Int. Cl.
| H04N 21/8405 | (2011.01) |
| G06F 16/783 | (2019.01) |
| H04N 21/8352 | (2011.01) |

(52) U.S. Cl.
CPC ....... *H04N 21/8405* (2013.01); *G06F 16/784* (2019.01); *G06F 16/7854* (2019.01); *H04N 21/8352* (2013.01)

(58) Field of Classification Search
CPC ............ H04N 21/8405; H04N 21/8352; G06F 16/784; G06F 16/7854
See application file for complete search history.

(56) References Cited

U.S. PATENT DOCUMENTS

| 2006/0262744 A1 | 11/2006 | Xu et al. |
| 2009/0103649 A1 | 4/2009 | Vare et al. |
| 2012/0078899 A1 | 3/2012 | Fontana et al. |
| 2012/0079380 A1 | 3/2012 | Tsai et al. |

(Continued)

OTHER PUBLICATIONS

PCT International Application No. PCT/KR2019/002786, Notification of Transmittal of the International Search Report and the Written Opinion of the International Searching Authority, or Declaration dated Jun. 19, 2019, 11 pages.

*Primary Examiner* — Nicholas T Corbo
(74) *Attorney, Agent, or Firm* — Lee Hong Degerman Kang Waimey

(57) ABSTRACT

A signal transmitting method comprising: inserting a context identifier and a keyword in service data to generate a content; extracting the service data from the content; inserting a description including the context identifier and the keyword to generate media data; generating signaling information including the context identifier and the keyword; and transmitting a signal including the media data and the signaling information.

14 Claims, 17 Drawing Sheets

(56) References Cited

U.S. PATENT DOCUMENTS

| | | | |
|---|---|---|---|
| 2013/0219431 A1 | 8/2013 | Hong et al. | |
| 2014/0147100 A1* | 5/2014 | Bakharov | G11B 27/034 386/282 |
| 2015/0193494 A1* | 7/2015 | Malamal Vadakital | H04N 21/85 707/697 |
| 2015/0215497 A1* | 7/2015 | Zhang | H04N 21/4347 348/521 |
| 2015/0254341 A1* | 9/2015 | Rai | H04H 60/56 707/736 |
| 2018/0278970 A1* | 9/2018 | So | H04N 21/4343 |
| 2019/0037252 A1* | 1/2019 | Wagenaar | H04L 65/602 |

* cited by examiner

FIG. 7

```
aligned (8)   class SampleToGroupBox
    extends FullBox ( 'sbgp', version, 0 )
{
    unsigned int (32)    grouping_type (context group_type == 'tcin')
    if (version == 1) {
        unsigned int (32)    grouping_type_parameter;
    }
    unsigned int (32)    entry_count;
    for ( i = 1 ; i <= entry_count ; i++ )
    {
        unsigned int (32)    sample_count (sequence 의 sample count) ;
        unsigned int (32)    group_description_index (context_id) ;
    }
}
```

FIG. 8

```
aligned (8)  class SampleGroupDescriptionBox  (unsigned int (32)  handler_type)
    extends FullBox ( 'sgpd', version, 0 ) {
    unsigned int (32)      grouping_type ;
    if (version == 1) { unsigned int (32)   default_length ; }
    if (version >= 2) { unsigned int (32)   default_sample_description_index ;
    }
    unsigned int (32)   entry_count ;
    int i ;
    for  ( i = 1 ; i <= entry_count ; i++ ) {
        if ( version == 1) {
            if ( default_length == 0 ) {
                unsigned int (32)   description_length ;
            }
        }
        SampleGroupEntry   ( grouping_type == 'tcin' ) ;
    }
}
```

FIG. 9

```
aligned (8)  class TimedcontextinformationSampleEntry ( )  extends VisualSampleGroupEentry (grouping_type = = 'tcin ') { unsigned int (32)   context_id ( group_description_index );
    unsigned int (1)    default_sequence_play_indicator ;
    if ( default_sequence_play_indicator = = 1 )
    {
        unsigned int (32)   defalut_sequence_play_context_id ( group_description_index );
    }
    unsigned int (32)   movie_fragment_sequence_number ;
    unsigned int (32)   context_sequence_number ;
    unsigned int (1)    AI_keyword ;
    if ( AI_keyword = = 1 )
    {
        string   keyword ; // optional
    }
    unsigned int (7) reserved ;
}
```

SIGNAL TRANSMITTING DEVICE, SIGNAL RECEIVING DEVICE, SIGNAL TRANSMITTING METHOD, AND SIGNAL RECEIVING METHOD

CROSS-REFERENCE TO RELATED APPLICATIONS

This application is the National Stage filing under 35 U.S.C. 371 of International Application No. PCT/KR2019/002786, filed on Mar. 11, 2019, which claims the benefit of earlier filing date and right of priority to Korean Application No. 10-2018-0027861, filed on Mar. 9, 2018, the contents of which are all hereby incorporated by reference herein in their entirety.

TECHNICAL FIELD

The present disclosure relates to a signal transmission device, a signal reception device, a signal transmission method, and a signal reception method.

BACKGROUND ART

As analog broadcast signal transmission came to an end, various techniques for transmitting and receiving digital broadcast signals have been developed. The digital broadcast signal is capable of carrying a larger amount of video/audio data than the analog broadcast signal and is capable of containing not only the video/audio data but also various types of additional data.

DISCLOSURE

Technical Problem

A digital broadcasting system may provide High Definition (HD) images, multi-channel audio, and various additional services. However, for digital broadcasting, data transmission efficiency for transmission a large amount of data, robustness of a transmission/reception network, and network flexibility in consideration of a mobile reception device need be improved.

Technical Solution

To achieve these objects and other advantages and in accordance with the purpose of the invention, as embodied and broadly described herein, a broadcast signal transmission method includes

Advantageous Effects

The present disclosure may provide various broadcast services by controlling quality of service (QoS) for each service or service component by processing data according to service characteristics.

The present disclosure may achieve transmission flexibility by transmitting various broadcast services through the same radio frequency (RF) signal bandwidth.

According to the present disclosure, data transmission efficiency and robustness of transmission and reception of broadcast signals may be improved using a multiple-input multiple-output (MIMO) system.

According to the present disclosure, a broadcast signal transmission and reception method and device capable of receiving a digital broadcast signal with a mobile reception device or in an indoor environment without error may be provided.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 7 shows the syntax of a sample group box in a media file format;

FIG. 8 shows the syntax of a sample group description box in the media file format;

FIG. 9 shows the syntax of a sample entry for context information;

BEST MODE

Exemplary embodiments of the present disclosure will be described in detail with reference to the accompanying drawings. The following detailed description with reference to the accompanying drawings is intended to illustrate preferred embodiments of the disclosure rather than merely illustrating embodiments that can be implemented according to the present disclosure. The following detailed description includes details in order to provide a thorough understanding of the present disclosure. It will be apparent, however, to those skilled in the art that the present disclosure can be practiced without these details.

Most of the terms used in the present disclosure are selected from the general ones widely used in the field, but some terms are arbitrarily selected by the applicant and the meaning thereof will be described in detail in the following description as necessary. Accordingly, the terms used herein should be construed based on the intended meanings thereof, rather than being construed simply based on names of the terms.

The present disclosure provides a device and method for transmitting and receiving broadcast signals for a next-generation broadcast service. The next-generation broadcast service according to an embodiment of the present disclosure includes a terrestrial broadcast service, a mobile broadcast service, and a UHDTV service. The present disclosure may process the broadcast signal for the next-generation broadcast service through a scheme of non-multiple input multiple output (non-MIMO) or MIMO according to one embodiment. The non-MIMO according to one embodiment of the present disclosure may include multiple input single output (MISO) and single input single output (SISO).

Hereinafter, for simplicity, the scheme of MISO or MIMO employs two antennas, but the present disclosure may be applied to a system employing two or more antennas.

Figure 1:
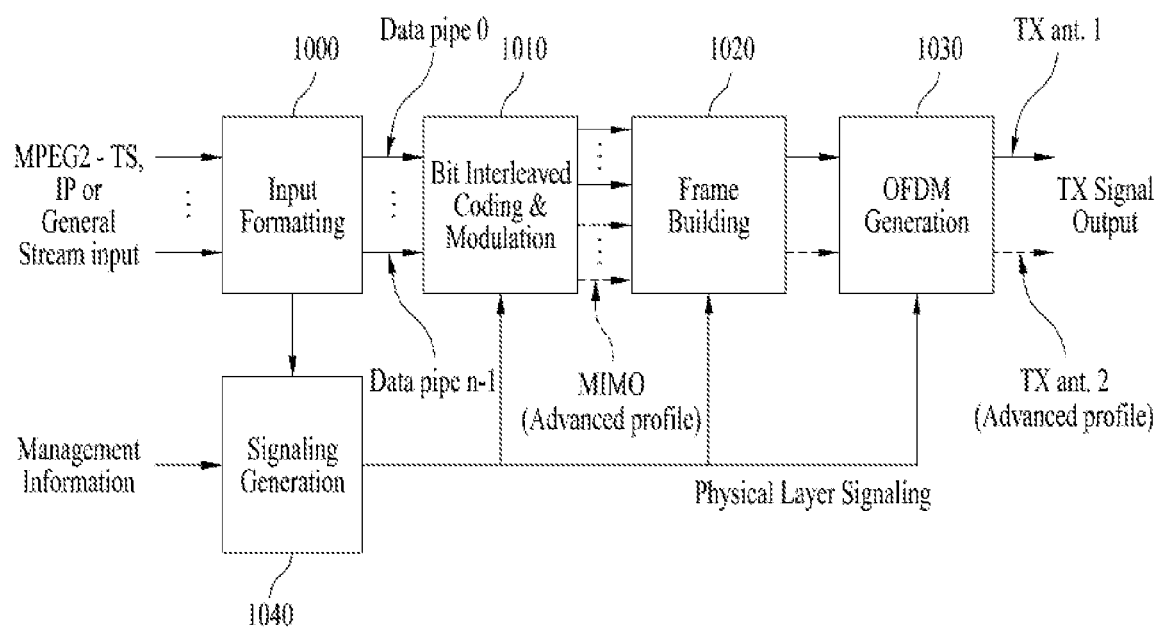
FIG. 1 shows a structure of a broadcast signal transmission device for a next-generation broadcast service according to embodiments of the present disclosure.

FIG. 1 shows a structure of a broadcast signal transmission device for a next-generation broadcast service according to an embodiment of the present disclosure.

The device for transmitting broadcast signals for next-generation broadcast services according to an embodiment of the present disclosure may include an input formatting block 1000, a bit interleaved coding & modulation (BICM) block 1010, a frame building block 1020, an orthogonal frequency division multiplexing (OFDM) generation block 1030, and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or more TS stream, IP stream and/or general stream inputs are simultaneously allowed.

The input formatting block 1000 may demultiplex each input stream into one or more data pipes, to each of which an independent coding and modulation is applied. The data pipe (DP) is the basic unit for robustness control, thereby affecting quality-of-service (QoS). One or more services or service components may be carried by a single DP. Details of operations of the input formatting block 1000 will be described later.

The data pipe is a logical channel in the physical layer that carries service data or related metadata, which may carry one or more services or service components.

In addition, the data pipe unit is a basic unit for allocating data cells to a DP in a frame.

In the input formatting block 1000, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The frame building block 1020 may map the data cells of the input DPs into the OFDM symbols within a frame. After mapping, the frequency interleaving is used for frequency-domain diversity, especially to combat frequency-selective fading channels. Details of operations of the frame building block 1020 will be described later.

After inserting a preamble at the beginning of each frame, the OFDM generation block 1030 may apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM generation block 1030 will be described later.

The Signaling Generation block 1040 may create physical layer signaling information used for the operation of each functional block. This signaling information is also transmitted so that the services of interest are properly recovered at the receiver side.

Figure 2:
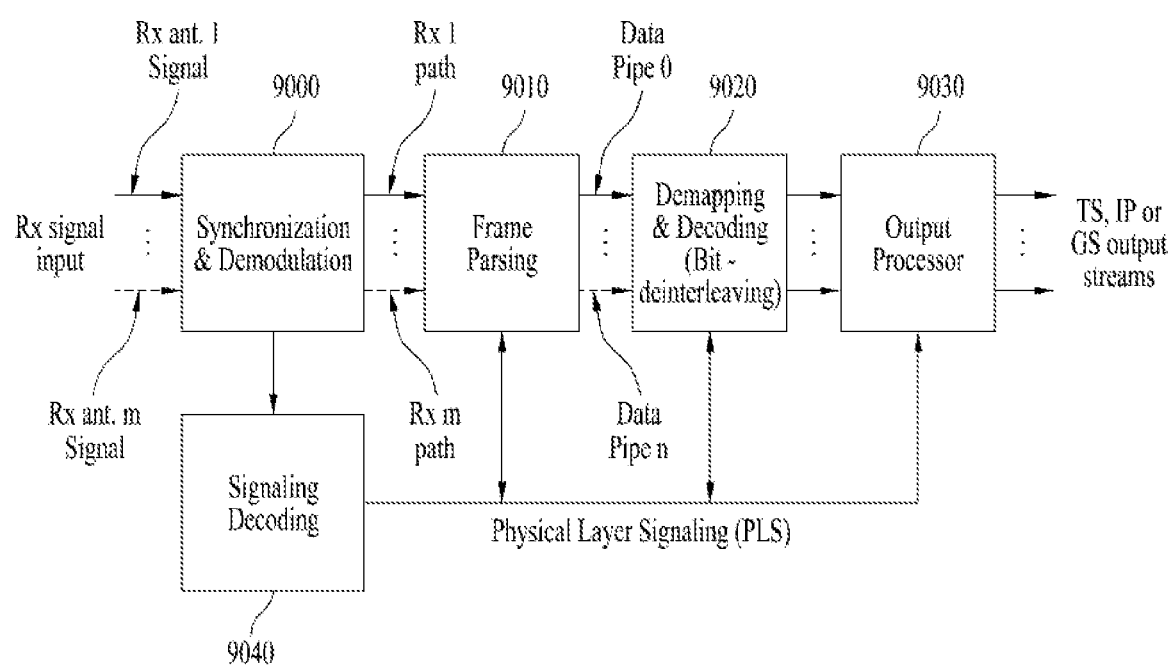
FIG. 2 shows a structure of a broadcast signal reception device for a next-generation broadcast service according to embodiments of the present disclosure.

FIG. 2 shows a structure of a broadcast signal reception device for a next-generation broadcast service according to an embodiment of the present disclosure.

The broadcast signal reception device for a next-generation broadcast service according to the embodiment of the present disclosure may correspond to the broadcast signal transmission device for the next-generation broadcast service described with reference to FIG. 1.

The broadcast signal reception device for the next-generation broadcast service according to the embodiment of the present disclosure may include a synchronization & demodulation module 9000, a frame parsing module 9010, a demapping & decoding module 9020, an output processor 9030 and a signaling decoding module 9040. A description will be given of operation of each module of the broadcast signal reception device.

The synchronization & demodulation module 9000 may receive input signals through m reception antennas, perform signal detection and synchronization for a system corresponding to the broadcast signal reception device and perform demodulation corresponding to a reverse procedure of the procedure performed by the broadcast signal transmission device.

The frame parsing module 9010 may parse an input signal frame and extract data through which a service selected by a user is transmitted. When the broadcast signal transmission device executes interleaving, the frame parsing module 9010 may execute deinterleaving, which corresponds to a reverse procedure of interleaving. In this case, the positions of a signal and data that need to be extracted may be acquired by decoding data output from the signaling decoding module 9040 to restore scheduling information generated by the broadcast signal transmission device.

The demapping & decoding module 9020 may convert the input signals into bit-domain data and then deinterleave the same as necessary. The demapping & decoding module 9020 may perform demapping for mapping applied for transmission efficiency and correct, through decoding, an error generated on a transmission channel. In this case, the demapping & decoding module 9020 may acquire transmission parameters necessary for demapping and decoding by decoding the data output from the signaling decoding module 9040.

The output processor 9030 may perform reverse procedures of various compression/signal processing procedures which are applied by the broadcast signal transmission device to improve transmission efficiency. In this case, the output processor 9030 may acquire necessary control information from the data output from the signaling decoding module 9040. The output of the output processor 8300 may correspond to a signal input to the broadcast signal transmission device and may be an MPEG-TS, IP stream (v4 or v6) and GS.

The signaling decoding module 9040 may acquire PLS information from the signal demodulated by the synchronization & demodulation module 9000. As described above, the frame parsing module 9010, the demapping & decoding module 9020 and the output processor 9030 may execute functions thereof using the data output from the signaling decoding module 9040.

A signal transmission device and signal reception device according to embodiments of the present disclosure may include the broadcast transmission device and reception device as shown in FIGS. 1 to 2. The signal transmission device and the signal reception device according to the embodiments of the present disclosure are not limited to the broadcast transmission and reception devices, and include a device for processing and transmitting data and a device for receiving the same.

Figure 3:
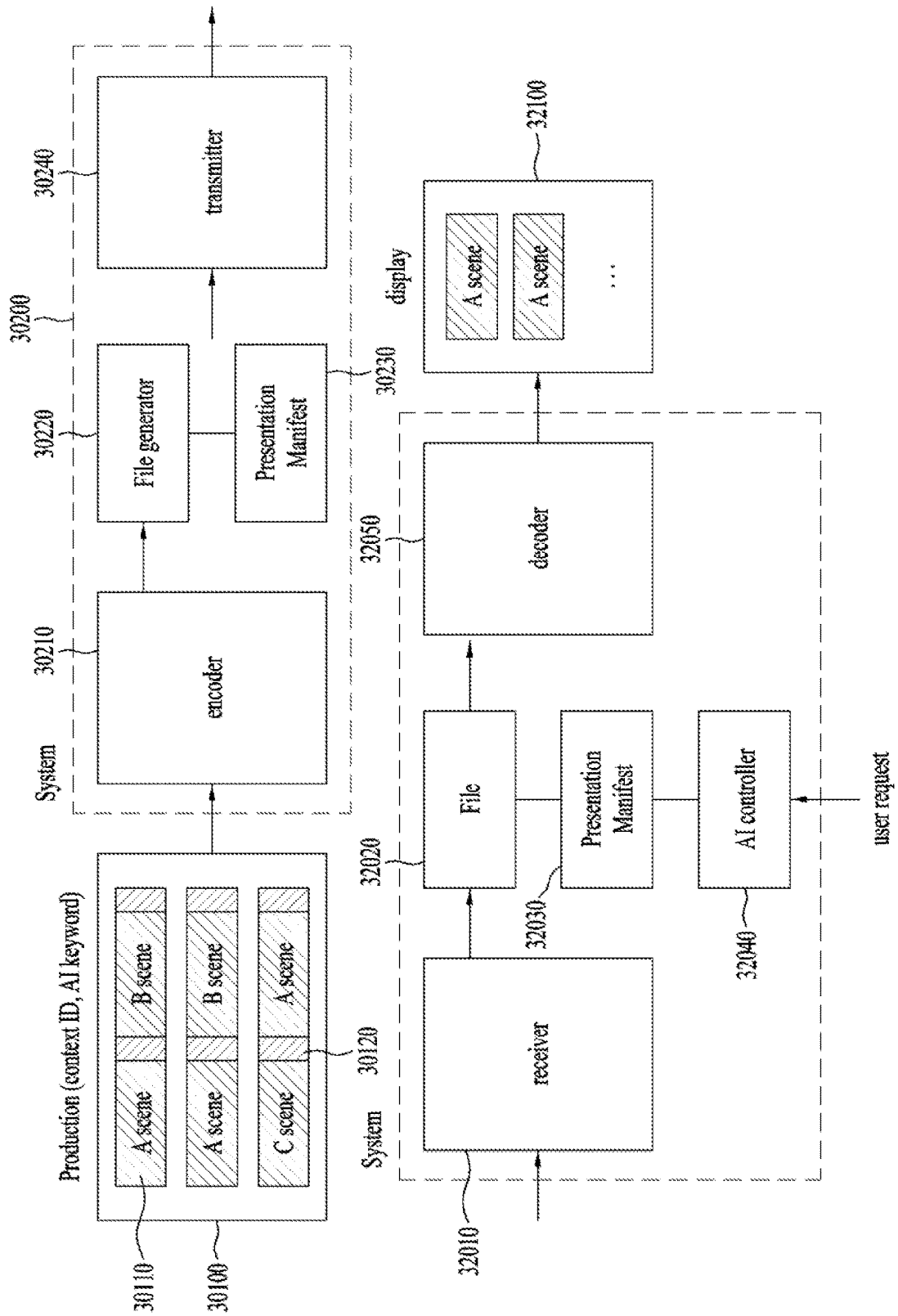
FIG. 3 shows a configuration of a system including a signal transmission device and a signal reception device according to embodiments of the present disclosure.

FIG. 3 shows a configuration of a system including a signal transmission device and a signal reception device according to embodiments of the present disclosure.

A system including a signal transmission device and a signal reception device according to embodiments of the present disclosure may provide context-based AI (artificial intelligence) media service. The signal transmission device according to the embodiments of the present disclosure may include a production 30100 and a system 30200.

The production 30100 according to the embodiments of the present disclosure may generate content data. The production 30100 inserts context identification information (context ID) and a keyword in service data constituting the content data. The context ID refers to information for identifying context information in the service data of content. The keyword is a keyword recognizable by AI. The keywords may include a natural language used by the user. The signal transmission device according to the embodiments of the present disclosure may use a context identifier and a natural language keyword to provide the context-based media service. Through the context and keywords, the signal transmission device according to the embodiments of the present disclosure may provide a specific and selective media service desired by a user. In this specification, the context identification information and keyword information may be referred to as an AI/context identifier.

Referring to FIG. 3, the service data constituting content may include A/V data 30110. The service data may include 'A' data (A scene) 30110, 'B' data (B scene), and 'C' data (C scene). The production 30100 may insert the AI/context identifier 30120 including context identifier information indicating the 'A' data and the keyword information in the 'A' data. The inserted AI/context identifier 30120 may be positioned behind the 'A' data as shown in FIG. 3. The production 30100 according to the embodiments of the present disclosure may process matching of the natural language requested by the user by inserting the AI/context identifier 30120 directly into the service data. When service data without the AI/context identifier 30120 is encoded, the encoded data is systematic information, and accordingly the signal processing device cannot process the natural language request from the user. As in the case of the 'A' data, the production 30100 may insert an AI/context ID related to each data in the 'B' data (B scene), 'C' data (C scene), and the like. The production 30100 transmits, to the system 30200, the content generated based on the context identification information and keyword information.

The production 30100 according to the embodiments of the present disclosure generates the AI/context ID information 30120 based on the context of the media data included in the media stream. The generated AI/context ID information 30120 is used as mark-up information for media data.

The production 30100 may be positioned before the BICM 1010 in the configuration of the broadcast signal transmission device according to FIG. 1. In addition, the production 30100 may be positioned in front of an encoder that encodes service data in a separate system other than the broadcast signal transmission device. In this specification, the production 30100 may be referred to as a content producer, a producer, a first producer, or the like.

The system 30200 according to embodiments of the present disclosure may include an encoder 30210, a file generator 30220, a signaling information generator (presentation manifest) 30230, and/or a transmitter 30240.

The encoder 30210 according to the embodiments of the present disclosure may encode content generated by the production 30100. The encoder 30210 may correspond to the BICM module 1010 of FIG. 1. The encoder 30210 may perform BCH (Bose, Chaudhuri, Hocquenghem) encoding or LDPC (Low-Density Parity Check) encoding. The encoder 30210 may check for errors in data containing content, or correct errors. The encoder 30210 passes the data containing the content to the file generator 30220.

In other words, the encoder 30210 according to the embodiments of the present disclosure receives content including the media data 30110, the context ID information 30120, and the AI keyword 30120 from the production 30100, and encodes the content. When the encoder 30210 according to the embodiments of the present disclosure can recognize the mark-up information such as the context ID information 30120 and the AI keyword 30120, it encodes the sequence or stream containing the mark-up information and media data. When the encoder 30210 according to the embodiments of the present disclosure cannot recognize the mark-up information such as the context ID information 30120 and the AI keyword 30120, the encoder encodes only the media data, ignoring the mark-up information such as the context ID information 30120 and the AI keyword 30120.

The file generator 30220 may generate data containing content in a format according to ISO BMFF (base media file format). The ISO BMFF media file may be used in broadcast network/broadband delivery, media encapsulation and/or synchronization format. In this specification, the data containing content may be referred to as service data or media data. In addition, the service data is all data related to a service, and may be a concept covering service components constituting a linear service, signaling information thereon, non real time (NRT) data, and other files. The file generator 30220 may transfer the service data to the transmitter 30240. In this specification, the file generator 30220 may be referred to as a first generator, a second generator, or the like.

The signaling information generator 30230 may generate signaling information about media data. The signaling information generator 30230 according to the embodiments of the present disclosure may provide signaling information according to Moving Picture Experts Group-Dynamic Adaptive Streaming over HTTP (MPEG-DASH). According to embodiments of the present disclosure, the media data may conform to the format of DASH-based media. Here, the signaling information includes attribute and synchronization information for playing the DASH-based media. According to embodiments of the present disclosure, there may be various formats of media data, and the signaling information may be defined according to the format of the media data.

The signaling information generator 30230 may generate signaling information about media data and transmit the same to the transmitter 30240. In this specification, the signaling information generator 30230 may be referred to as a first generator, a second generator, or the like.

The transmitter 30240 may generate a signal containing service data and signaling information about the service data. The transmitter 30240 may transmit the signal. The transmitter 30240 may transmit the signal over a broadcast network or broadband. In this specification, the signal is not limited to a broadcast signal, and may be interpreted as a signal containing video data or audio data.

A signal reception device according to embodiments of the present disclosure may include a system 32000 and a display 32100.

The system 32000 according to the embodiments of the present disclosure may include a receiver 32010, a file 32020, a signaling information decoder (presentation manifest) 32030, a controller 32040, and/or a decoder 32050.

The receiver 32010 may receive a signal. The receiver 32010 may receive a signal containing data. The receiver 32010 may transfer the signal containing the data to the file 3220. The signal may contain service data and signaling information.

The file 32020 may acquire or parse the service data in a file format from the signal. The file 32020 may perform an operation reverse to that of the file generator 30220 of the signal transmission device according to embodiments of the present disclosure. In this specification, the file 32020 may be referred to as a file parser, a file decoder, or the like. The file 32020 may transfer the service data to the decoder 32050.

The signaling information decoder 32030 may acquire or decode signaling information about the service data from the signal. The signaling information decoder 32030 may perform an operation reverse to that of the signaling information generator 30230 of the signal transmission device according to embodiments of the present disclosure.

The controller 32040 may receive a user request. In the present specification, the user request may include a user input signal and a user command. The signal reception device according to the embodiments of the present disclosure may display guide information about service data to the user through service guide information included in the signal. The signaling information decoder 32030 may acquire signaling information from the signal and provide the signaling information about the service data to the user. The user may make a request to the controller 32040 for a service that the user desires through the signaling information by a natural language. The controller 32040 receives the request by the natural language from the user. The controller 32040 controls the signal reception device to access the service data desired by the user through the signaling information. The controller may use an AI scheme in the process of responding to the request from the user by the natural language.

The decoder 32050 decodes the service data and signaling information about the service data. The decoder 32050 performs an operation reverse to the process of the encoder 30200 of the signal transmission device according to the embodiments of the present disclosure. The decoder 32050 transfers the service data and the signaling information about the service data to the display 32100.

The display 32100 may display A/V data 32100 included in the service data. The data 32100 may be "A" data included in the data 30110 generated by the signal transmission device according to embodiments of the present disclosure. In this specification, the display 32100 may be referred to as a display part, a display unit, or the like. The display 32100 according to the embodiments of the present disclosure may selectively display media data based on request information received from a user through the controller 32040.

Figure 4:
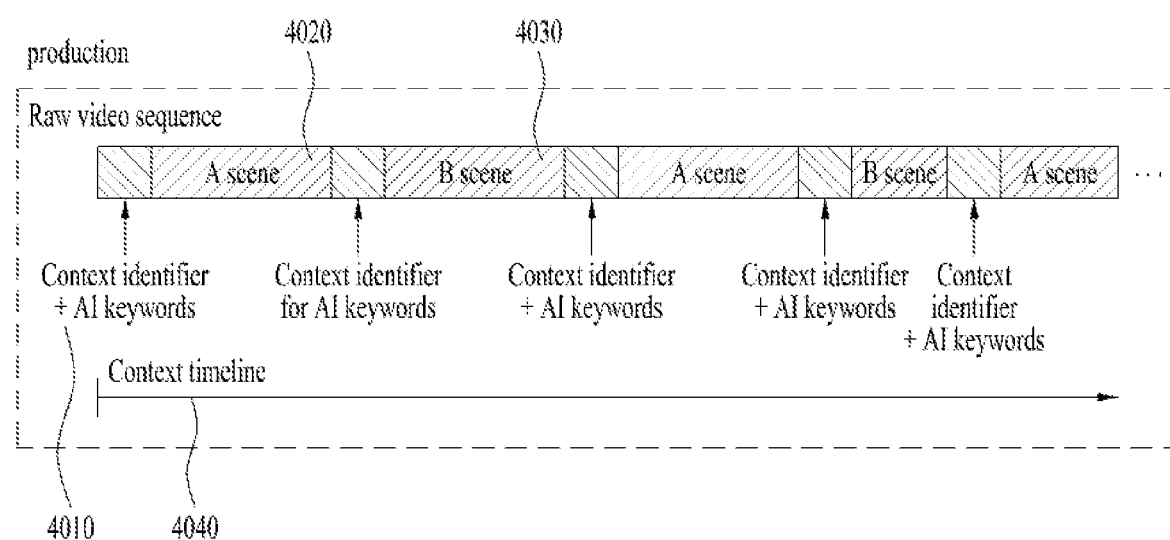
FIG. 4 shows a structure of context-based service data.

FIG. 4 shows a structure of context-based service data.

The production 30110 may insert an AI/context identifier including a context identifier and one or more keywords into service data. The system 30200 including the encoder 30200 may encode the data by recognizing only a media data sequence. For this reason, the system 30200 does not recognize context-based service data. Accordingly, the signal transmission device according to the embodiments of the present disclosure may generate context-based service data through the production 30110 as shown in FIG. 4.

Accordingly, the production 30100 according to the embodiments of the present disclosure may transmit content to the encoder 30200, and the encoder 30200 may encode the service data contained in the content. The production 30100 may transmit the content to the file generator 30220, and the file generator 30220 may generate a structure of media data used for transmission based on the context-based information and the service data, which are included in the content. The structure of media data will be described in detail with reference to FIGS. 4 and 5.

A raw video sequence may be input to the production 30100. The raw video sequence data may include A data (A Scene) 4020 and B data (B Scene) 4040. The production 30100 inserts, into the A data, a context identifier 4010 for identifying the A data and one or more keywords 4010 related to the A data. The production 30100 may insert the context identifier and the keyword 4010 in front of the A data. The production 30100 according to embodiments of the present disclosure may insert the context identifier and the keyword 4010 after A data. The production 30100 generates a single content including A data and a context identifier and keywords for the A data. The production 30100 inserts the context identifier and keywords into the data based on a context timeline 4040 to identify the data based on the context. The production 30100 may generate a video sequence including a plurality of contents by inserting a context identifier and keywords for each data into the A data and B data included in a row video sequence. The production 30100 transfers the context-based content data to system 30200.

For example, when there is media data for a soccer game, A data (A scene) for player A appearing in the soccer game may be in a video sequence. Here, context identification information and AI keyword information 4010 for mark-up of the A data may be inserted before one or more A data contained in the video sequence.

In addition, according to embodiments of the present disclosure, when a ball touch scene of player A appearing in the soccer game is classified as A data, player B and player C appearing in the A data may also be marked-up using the context identification information and the AI keyword information 4010 for each A data. The mark-up information and the media data that is a target of the mark-up information may be classified in variously ways according to embodiments of the present disclosure.

Since the production 30100 inserts or marks up the context identification information and keyword information 4010 in the media data according to the context timeline 4040, and transfers the content to the encoder 30200, the encoder 30200 may receive content in the form of a track aligned with a timeline such as the context timeline 4040 as timed metadata. As shown in FIG. 4, since the production 30100 generates content, even an encoder in which the AI system is not supported may process A data (Scene grouping) included in the media data. Accordingly, the signal transmission device and reception device according to embodiments of the present disclosure may provide compatibility between an encoder in which an AI system is supported and an encoder in which the AI system is not supported. That is, when the encoder 30200 according to embodiments of the present disclosure receives media data and timed metadata in two tracks from the production 30100, the encoder may encode only the media data. When the encoder 30200 receives content in a single track from the production 30100, it may encode only the video data, ignoring the mark-up information contained in the video stream.

The A data (A scene) in FIG. 4 may refer to a sample group. A sample represents a frame in a media file. That is, one sample means one frame of media, or an accessible media accessing unit smaller than or equal to the frame unit. Accordingly, the signal reception device according to the embodiments of the present disclosure may access the aligned sample or sample group through the sample entry. The sample group means a bundle of samples. The sample group represents a meaningful group of samples. The sample group is accessed through a sample entry and a description for the sample group. In comparison with the sample entry, the sample group entry represents a sample group bundled according to a grouping attribute. The sample entry represents a sample accessible without the grouping attribute. Here, the grouping attribute is represented by grouping type information (grouping_type).

Figure 5:
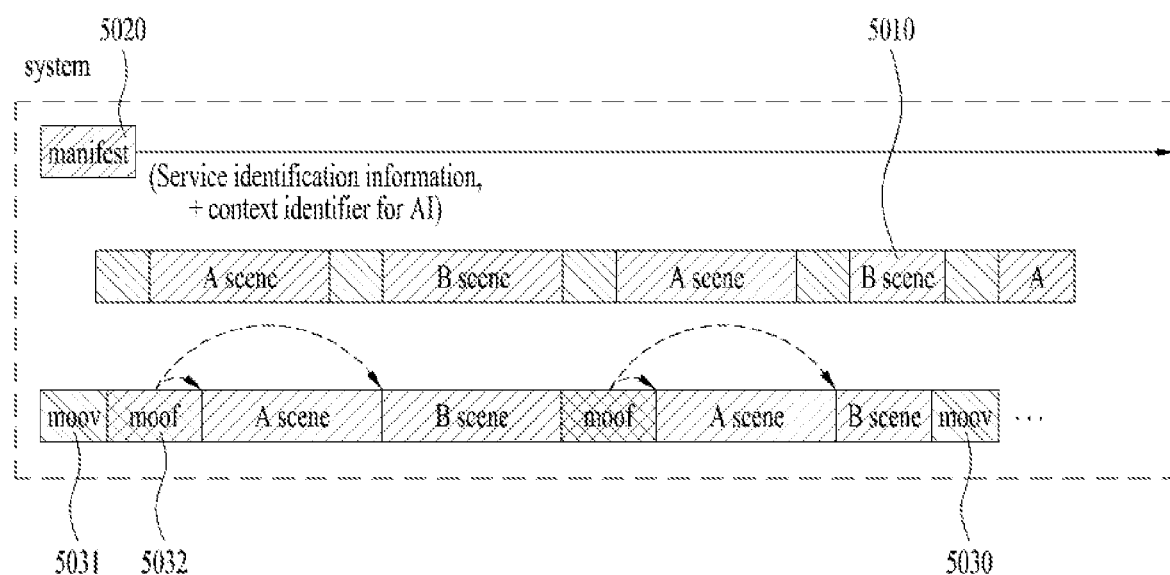
FIG. 5 shows a configuration of service data and signaling information transmitted by a signal transmission device.

FIG. 5 shows a configuration of service data and signaling information transmitted by a signal transmission device.

As described above, since the system 30200 process context-based data by recognizing the same, the system 30200 generate service data such that the signal transmission device may transmit context-based content generated by the production 30110. Further, the system 30200 generates signaling information about the service data to be transmitted.

The system 30200 receives content 5010 from the production 30110. The content 5010 includes a context identifier and a keyword for each data. The encoder 30200 encodes media data contained in the content.

The file generator 30220 may receive the content 5010 from the production 30110 and generate media data 5030 in a file format. The file generator 30220 may transmit the media data based on a container format 5030 for media data transmission.

The media data 5030 according to embodiments of the present disclosure may include a box form according to ISO BMFF. Boxes according to the ISO BMFF include a moov box, a moof boxes, and a mdat box. Such boxes may have a hierarchical structure. The hierarchical structure of the boxes will be specifically described with reference to FIG. 6.

In other words, the system 30200 according to the embodiments of the present disclosure generates signaling information 5020 including information containing a context identifier and keywords from the content 5010, and extracts only the service data (A Scene, B Scene, etc.) except the context identifier and the keywords from the content 5010 to generate the media data 5030. The signaling information 5020 may be generated by the signaling information generator 30230. The media data 5030 may be generated by the file generator 30220.

FIG. 5 shows the media data 5030 containing a moov box 5031 and a moof box 5032. The moof box 5032 is a movie fragment box and is contained in the file. The moof box 5032 includes a hierarchical class, and a specific class includes a sample description corresponding to each entry instance according to an entry of the data in the current media file. The file of the media data may provide information to access each sample or to a group of samples.

The media data or segment 5030 may contain a moov box 5031. The moov box 5031 may contain decoding initialization information about a media sample (A Scene, B Scene, etc.) that follows the moov box 5031. The moov box 5031 may contain sample description information and sample grouping information about media samples (A Scene, B Scene, etc.).

The media data or segment 5030 contains a moov box 5031, followed by a moof box 5032. The moof box 5032 may provide a description of a specific sample by time indexing and grouping of samples using the media fragment contained in the moof box 5032. The signal transmission device according to embodiments of the present disclosure uses a sample group box (SampleToGroup Box (sbgp)) included in the moov box 5031 to provide sample grouping. The SampleToGroup Box (sbgp) may contain grouping information about each sample (group type), and provide a specific description of each grouped entry based on the class of the sample group description box. The specific syntax of the SampleToGroup Box (sbgp) will be described with reference to FIG. 7, and the specific syntax of the sample group description box will be described with reference to FIGS. 8 and 9.

Since the signal transmission device according to the embodiments of the present disclosure generates media data using content for which context information is directly inserted into data as shown in FIG. 5, context-based access to media data may be implemented.

Further, information about context-based access may not be acquired from a box-type file generated based on only a video data sequence. Further, in order to transfer additional information included in the file format, the signal transmission device may transmit timed metadata. In this method, additional data may be processed through a system time aligned hint track associated with a media track. Even when the system generates and transmits metadata to transmit media-related data, the metadata may not reflect the context of media data. In addition, the signal transmission device may insert an additional text metadata sample into an encoding frame structure of data. The signal transmission device may insert the additional metadata sample at a position designated by a random access point on the encoding frame structure. However, it is proposed that the signal transmission device according to the embodiments of the present disclosure directly insert context information about media data in the frame structure including the media data, rather than inserting the metadata at a specific position.

In other words, the signal transmission device according to the embodiments of the present disclosure does not require accessing media included in a file based on a byte sequence of video data. In addition, the signal transmission device according to the embodiments of the present disclosure configures information for context-based access in a media file format. Further, using the information for context-based access, the system 30200 may encode the media data. This encoding scheme is not limited to the encoding frame attribute of the media data. That is, the media data may be accessed based on persons, episodes, views, etc., which are information related to the media data. The information about context-based access is not limited to video metadata (optional) initialization information about the media data or additional metadata in a URI form, and may be defined by extending specific information included in the ISO BMFF.

The signaling information generator 30230 generates signaling information based on the data, context identifier, and keyword contained in the content received by the system 30200 from the production 30110. The signal transmission device and the signal reception device according to the embodiments of the present disclosure may provide a context-based media service based on the signaling information generated by the signaling information generator 30230. In addition, the signal transmission device and the signal reception device according to the embodiments of the present disclosure may provide a context-based AI media service based on the signaling information.

The signaling information generator 30230 may generate signaling information and insert the same in the manifest 5020. The manifest 5020 may include information for identifying service data contained in the content, context identification information about service data, and keyword information about an AI media service. The manifest may transmit additional data related to content through service signaling.

In addition, the signaling information generator 30230 recognizes additional context-related data of the content generated by the production 30110. The signaling information generator 30230 inserts the additional context-related data of the content in the manifest as service signaling information.

Through the media data and signaling information as shown in FIG. 5, the signal transmission device according to embodiments of the present disclosure may access each scene or sequence for a media file based on the context identifier. In addition, the controller 32040 receives an AI request from the user, and acquires service signaling information contained in the manifest matching the context. Accordingly, the controller 32040 requests a file matching the context and the AI natural language. Then, the display 32100 plays the matching file. The signal transmission device according to embodiments of the present disclosure may provide a context-based AI media service to the user.

Figure 6:
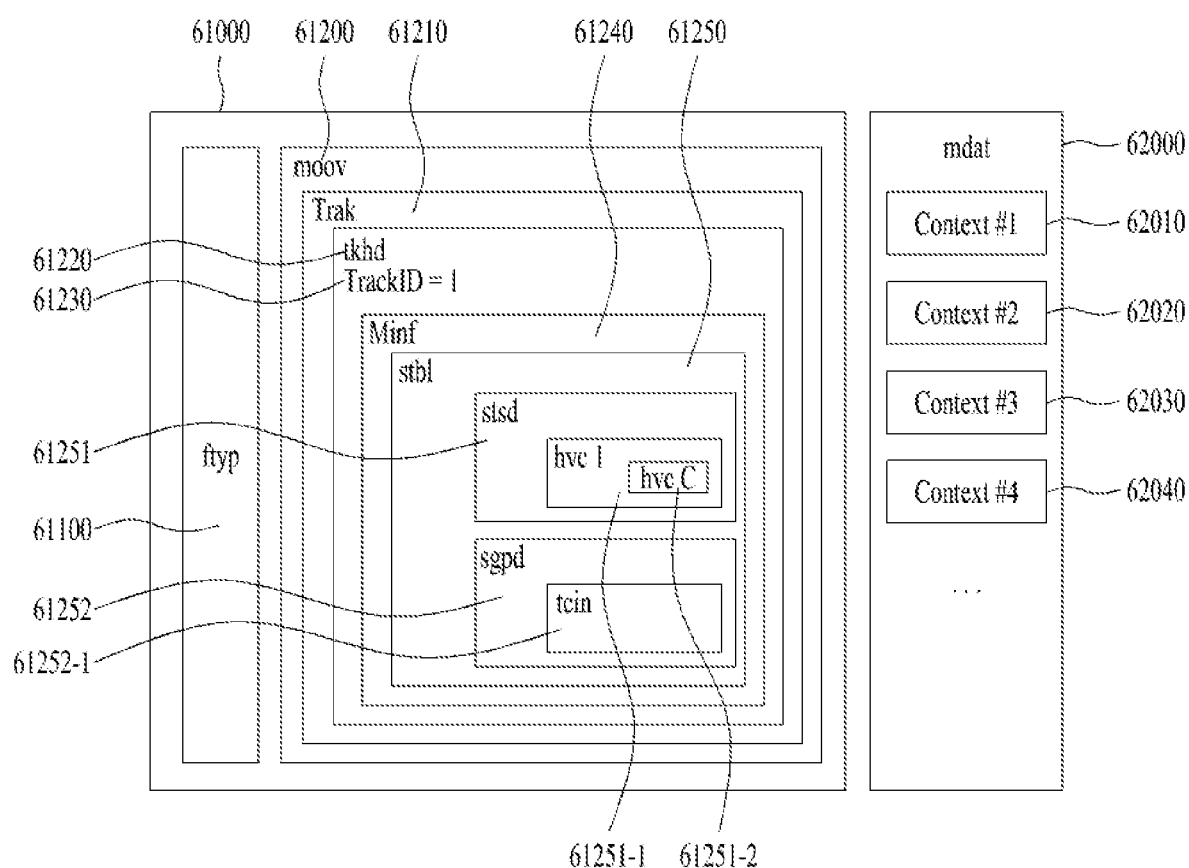
FIG. 6 shows a structure of a file format in which context information is inserted.

FIG. 6 shows a structure of a file format in which context information is inserted.

As described above, the production 30100 generates content using context-related information including a context identifier and a keyword according to a context timeline. The system 30200 extracts the service data 4020 and 4030 from the content, and generates boxes 5031 and 5032 to generate media data. FIG. 6 shows a hierarchical structure of a file format of media data with timed context related information inserted therein. The media file format of FIG. 6 may be understood with reference to the standard ISO/IEC 14496-12. The media file format according to the embodiments of the present disclosure may be defined according to a container or box type structure as shown in FIG. 6 as well as the standard ISO/IEC 14496-12.

The media data 5030 according to embodiments of the present disclosure includes a first box 61000 containing context-related signaling information and a second box (mdat) 62000 containing context-related media data. The second box (mdat) 62000 represents a media data container or a media data box.

The first box 61000 includes a third box (ftyp) 61100 and a fourth box (moov) 61200.

The third box (ftyp) 61100 is a file type box and contains information indicating the type of a media file. A file may be identified through the information in the third box. The third box (ftyp) 61100 may be positioned in front of the media data.

The fourth box (moov) 61200 is a movie box, and is positioned behind the third box 61100. The fourth box 61200 contains metadata for presentation. The fourth box (moov) 61200 includes a fifth box (Trak) 61210. In this specification, the fourth box (moov) 61200 may be referred to as a movie box.

The fifth box (Trak) 61210 is a track box. The fifth box (Trak) 61210 represents a container box for a single track of presentation. A presentation consists of one or more tracks. The fifth box (Trak) 61210 contains time and space information about media data. The fifth box (Trak) 61210 includes a sixth box (tkhd) 61220.

The sixth box (tkhd) 61220 is a track header box. Since one track box is included in one track, the sixth box (tkhd) 61220 includes characteristics information about a single track. When the track identifier (TrackID) is 1, the sixth box (tkhd, 61220) includes a seventh box (Minf) 61240.

The seventh box (Minf) 61240 is a media information box, and contains characteristics information about media contained in the track. The seventh box (Minf) 61240 includes an eighth box (stbl) 61250.

The eighth box (stbl) 61250 is a sample table box, and is included in the media information box (Minf). The eighth box (stbl, 61250) contains information about media samples contained in the track. Based on the information contained in the eighth box (stbl) 61250, the positions of the samples in time may be identified, and the type and size of the samples may be identified. The eighth box (stbl) 61250 includes a ninth box (stsd) 61251 and a tenth box (sgpd) 61252.

The ninth box (stsd) 61251 is a sample description box, and is included in the sample table box (stbl). The ninth box (stsd) 61251 contains information about the coding type and/or initialization information necessary for coding.

The tenth box (sgpd) 61252 is a sample group description box, and is included in the sample table box. The tenth box (sgpd) 61252 contains characteristics information about sample groups. The tenth box (sgpd, 61252) contains information necessary to define a sample group or to represent the characterizes thereof. When there are multiple sample groups for samples contained in the track, there may be multiple instances of the sample group description box.

The ninth box (stsd) 61251 includes an eleventh box (hvc1) 61251-1. The eleventh box (hvc1) 61251-1 includes a twelfth box (hvcC) 61251-2. The eleventh box (hvc1) 61251-1 and the twelfth box (hvcC) 61251-2 are video sample description boxes based on video encoding of High Efficiency Video Codec (HEVC). The ninth box (stsd) 61251 may include sample descriptions according to various video encoding methods such as MPEG-2, AVC, and HEVC. FIG. 6 shows a structure in which the class of hvc1-hvcC description according to HEVC is used.

The tenth box (sgpd) 61252 includes a twelfth box (tcin) 61252-1. The tenth box (sgpd) 61252 may be defined under the ninth box (stsd) 61251. When the tenth box (sgpd) 61252 is positioned under the ninth box (stsd) 61251, the tenth box (sgpd) 61252 may be used to provide grouping information about a sample according to the attribute of the ninth box (stsd) 61251. The specific syntax for samples and sample grouping according to the hierarchy of the boxes in FIG. 6 will be described in detail with reference to FIGS. 7 to 9.

The signal transmission device according to the embodiments of the present disclosure may provide description information about samples contained in the media data or video sequence and each entry grouping samples using a group description index, a context sequence number, and an AI keyword contained in the twelfth box (tcin) 61252-1. The specific syntax of the twelfth box (tcin) 61252-1 will be described with reference to FIG. 9.

The second box (mdat) 62000, which is a media data box, is a container for media data. For a video track, the second box (mdat) 62000 contains a video frame. The presentation includes zero or one or more media data boxes. FIG. 6 shows a configuration in which the second box (mdat) 62000 contains a context for media data. The second box (mdat) 62000 may contain a plurality of contexts. In this specification, the contexts may be referred to as a first context 62010, a second context 62020, a third context 62030, a fourth context 62040, and the like.

The ninth box (stsd) 61251 may describe information defining a sample description through the eleventh box (hvc1) 61251-1 and the twelfth box (hvcC) 61251-2. When the second box (mdat) 62000 contains a plurality of media data, for example, video data, the media file format may include a sample description according to time aligned timed context information. And information for the sample description may be contained in the eleventh box (hvc1) 61251-1 and the twelfth box (hvcC) 61251-2, which are sub-boxes of the ninth box (stsd) 61251.

The signal transmission device according to the embodiments of the present disclosure may separate video sequences according to context, and access the video sequences separated according to the context to selectively and independently play video data. In order to access the video data based on the context and to selectively and independently play the video data, the signal transmission device according to embodiments of the present disclosure may distinguish, as shown in FIG. 6, multiple contexts through sample grouping information of a media file format. The syntax of specific sample grouping will be described with reference to FIG. 7.

FIG. 7 shows the syntax of a sample group box in a media file format.

The SampleToGroup Box (sbgp) of FIG. 7 may be further included in the eighth box (stbl) 61250 of FIG. 6. The SampleToGroup Box may be used to find a group to which a sample belongs. The SampleToGroup Box may be used to find a description associated with a sample group. The SampleToGroup Box may contain grouping_type information and group_description_index information.

The grouping_type is information for identifying the type of sample grouping. The grouping_type indicates a criterion or type used to generate a sample group. The grouping_type may also be used to link to a sample group description table having the same value for the grouping type. The sample group box having the same value for the grouping type based on grouping_type_parameter may exist at most once for one track.

The group_description_index represents an index of a sample group entry describing samples included in a group. The index may have a value ranging from 1 to the number of sample group entries included in the sample group description box. When a sample is a member of a group other than a group of this type, the index may have a value of zero.

Accordingly, the SampleToGroup Box may provide samples and descriptions related to a specific sample group, thereby providing group information about various entry instances.

The grouping_type information and the group_description_index information in the SampleToGroup Box may be defined based on 14496-12 ISOBMFF.

The signal transmission device according to embodiments of the present disclosure may extend the grouping_type information and the group_description_index information. The signal transmission device according to the embodiments of the present disclosure may define tcin by newly assigning a value of the grouping_type information.

FIG. 7 shows a case where the context group type is tcin. A sample group corresponding to the case where the context group type is tcin may support the context-based selective media service.

When there is a box having the same sample group type in one track, the grouping_type_parameter may indicate a sample group having the same value.

The entry_count information in the sample group box indicates the number of entries included in a table. When the context group type is tcin, the entry count information indicates the total number of video sequences divided by context. The entry_count information may indicate a group entry. The sequence for each entry_count includes a sample count and a group description index.

The sample count indicates the number of samples contained in the sequence. The group description index indicates indexing information about a bundle grouped according to a context identifier. When the context group type is tcin, the group description index refers to identification information (ID) for identifying a context in which video data is divided according to a criterion such as episodes or characters. To divide media data by context, the media file format may be further extended. The additional extended file format will be specifically described with reference to FIG. 8.

FIG. 8 shows the syntax of a sample group description box in the media file format.

The sample group description box in FIG. 8 corresponds to the tenth box (sgpd) 61252. The sample group description box of FIG. 8 is a box that may provide descriptions of group entries defined in the SampleToGroup Box of FIG. 7. The number of descriptions for an entry, which is a bundle of currently designated samples, may be adjusted according to an entry value. The sample group description box further includes a sample group entry (Sample GroupEntry) to allow the signal transmission device according to embodiments of the present disclosure to identify a set or sequence of samples corresponding to a context for video data or media data and to access the media data through keywords for a user request. The sample group entry may be further extended by further including a visualsmplegroupentry. The interior of the visual sample group entry may be further extended as shown in FIG. 9. The extended internal structure of the visual sample group entry will be specifically described with reference to FIG. 9.

The grouping type is information for identifying the type of sample grouping. The entry_count indicates the total number of video sequences divided by context. For each entry count, a length or number of descriptions for a sequence divided for each context may be defined.

The default length indicates a length for a sample to be accessed by default in a sample grouping bundle according to a grouping type.

The default_sample_description_index indicates the index of a default sample description when there is a sample description to be accessed by default among the sample descriptions for an entry.

The entry_count indicates the number of sample groupings. For each entry count, when the default length is zero, the length of the description corresponding to the entry is contained in the sample description box. For each entry count, when the grouping type is tcin, the sample group entry is contained in the sample description box.

In other words, when the grouping type corresponds to tcin, the sample group description box provides information on the type and description length of the sample group, and further provides a sample group entry for each entry, thereby providing a context-based media service for the sample group entry.

FIG. 9 shows the syntax of a sample entry for context information.

When the grouping type is tcin, the sample group entry further includes a visual sample group entry. The visual sample group entry may be extended through a Timed Context Information Sample Entry of FIG. 9.

The context identification information (Context_id) is a distinguisher or an identifier that distinguishes a context. The Context_id may represent the same meaning as the group description index included in the SampleToGroup Box (sbgp). The group description index may be referred to as a sample description index. The group description index represents information indicating a bundle grouped based on the context identification information. The group description index or sample description index is used for context group indexing of a grouped bundle.

As described above with reference to FIG. 3, the signal transmission device according to the embodiments of the present disclosure may parse the content in which the context identification information and keywords (AI keywords) are inserted, to classify and categorize the media data included in the content by context based on the context identification information. Accordingly, the values of the context identification information are categorized by keyword (AI keyword) and context. The categorized values of the context identification information may be defined in DASH Media Presentation Description (MPD). The signal transmission device or the signal reception device according to the embodiments of the present disclosure may perform matching of each context using a value included in the MPD.

A default sequence play indicator (default_sequence_play_indicator) indicates whether a sequence should be played. Before selectively or independently playing media data according to context, the signal reception device according to the embodiments of the present disclosure may check whether the sequence should be played by checking the default_sequence_play_indicator.

The default_sequence_play_context_id specifies a reference context ID corresponding to a sequence that must be played before performing selective playback according to the context. The signal reception device according to the embodiments of the present disclosure may identify samples bundled for each context, and check a sequence to be played by default among the samples. When there is a sequence to be played by default, the reception device may check the context identifier of the sequence to be played by default corresponding to a group description index.

The movie_fragment_sequence_number specifies the number of a movie fragment sequence at the current time.

The context_sequence_number specifies the sequence number of consecutive samples grouped by the current context.

The AI_keyword indicates whether consecutive samples grouped by the current context include a keyword (AI keyword). When the grouping samples include the keyword, the keyword value (keyword) is included in the timed context information sample entry as a string type. The keyword refers to a keyword by which an AI-based request from the user may be recognized. Specifically, the keyword may include the name of a program, the type of the program, and the cast members of the program. Whether to include a keyword value is optional. That is, the signal transmission device according to embodiments of the present disclosure may insert keywords for samples for each context, and may not insert keywords. The signal reception device according to the embodiments of the present disclosure may parse the sample entry information, check a keyword value for each context ID, and connect the value with a keyword included in a natural language requested by the user to provide an selective media service to the user.

Using the sample entry box for context information of FIG. 9, the signal transmission device according to embodiments of the present disclosure may acquire a context ID for distinguishing media data or a video sequence according to the context contained in the content, and selectively play a sequence according to the context ID. In addition, the signal transmission device or the signal reception device according to the embodiments of the present disclosure may selectively play a sequence that satisfies the AI request from the user through the keyword (AI keyword) included in the sample entry box for context information.

Using the description boxes as shown in FIGS. 7 to 9, the signal transmission device and the reception device according to the embodiments of the present disclosure may provide a context-based media service. In other words, the signal transmission device and the reception device recognizes a user's natural language keyword based on the AI scheme, and connects the recognized keyword with context-related information contained in the media service, thereby providing a selective media service.

The signal transmission device according to the embodiments of the present disclosure may not only provide a service guide based on schematic information such as a title, a genre, and a character of a specific program or content, but also understand a natural language using an AI scheme. Furthermore, the signal transmission device of the present disclosure may construct and utilize big data based on the user's natural language. In addition, the signal transmission device according to the embodiments of the present disclosure may not only provide a VOD service, an OTT application, episode-specific service, and content by movie or date, but also provide media services by recognizing the context. The application service and the automatic content recognition (ACR) service are limited to UTC-based synchronized services.

The AI keywords according to the embodiments of the present disclosure are not limited to keywords such as titles or leading actors/actresses. Accordingly, the signal transmission device according to the embodiments of the present disclosure may access media based on various context-based keywords.

Figure 10:
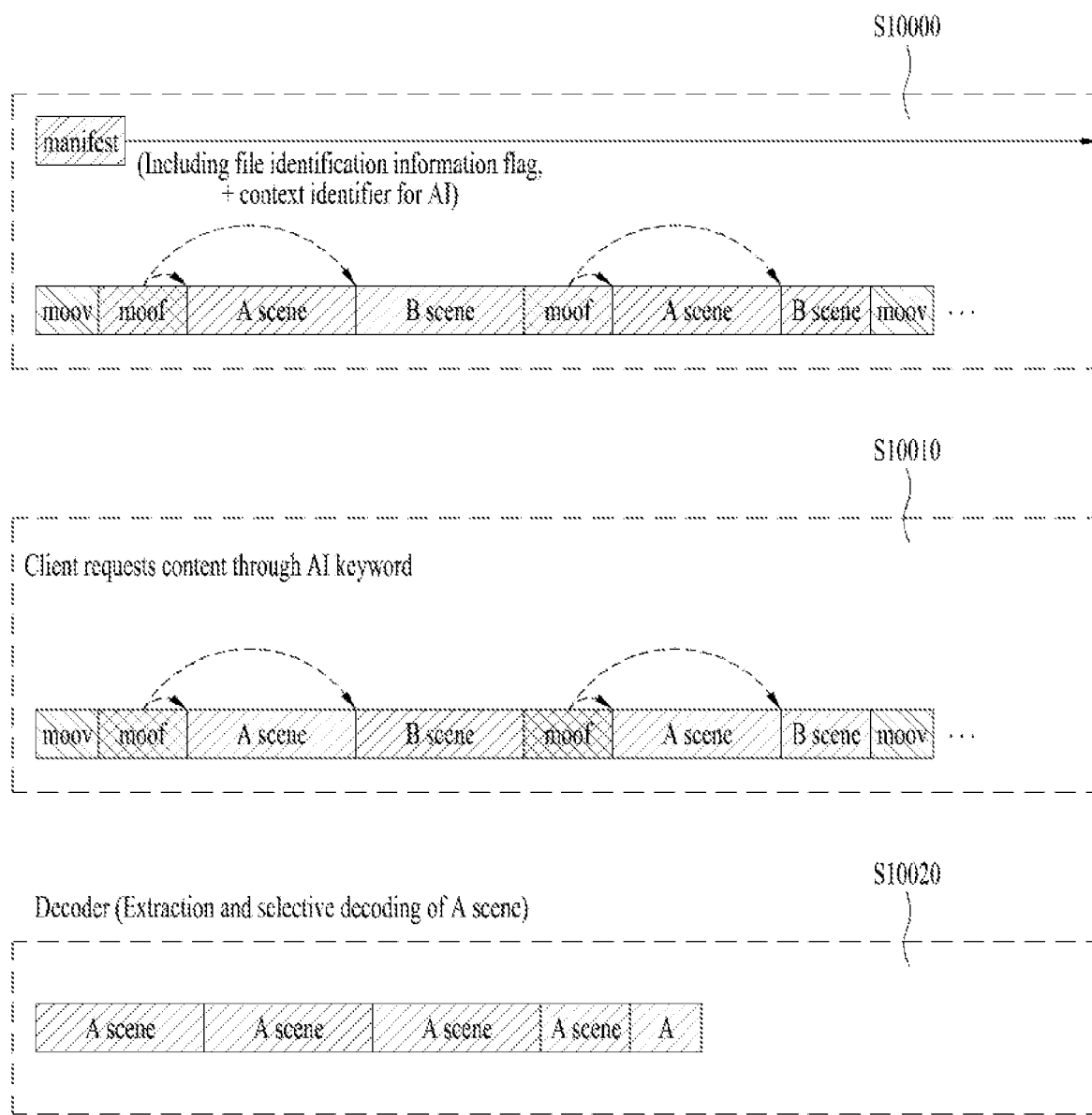
FIG. 10 illustrates a selective playback method based on context-related information.

FIG. 10 illustrates a selective playback method based on context-related information.

Referring to step S10000 of FIG. 10, after the production 30110 of the signal transmission device according to the embodiments of the present disclosure generates content based on context-related information including context identification information and AI keywords, the system 30200 generates signaling information about the context-related information, and generates content in a file format. As described above with reference to FIG. 6, the signal transmission device according to embodiments of the present disclosure may classify a video sequence or media data into a sample or a group of samples through a file format, and define an entry for the sample and an entry for the sample group, thereby selectively acquiring the video sequence based on the context identification information and keyword information.

Referring to step S10010 of FIG. 10, the signal reception device according to embodiments of the present disclosure receives a signal requesting content from a user or a client through the controller 32040. The controller 32040 analyzes a signal by which the client requests content, based on an AI scheme, and acquires an AI keyword from the content request signal.

The signal reception device according to the embodiments of the present disclosure may receive signaling information (manifest), and may recognize, through the signaling information, that the currently received content is a media service selectively playable by context through the AI keyword. The signal reception device according to the embodiments of the present disclosure may provide a service guide through service signaling based on the signaling information (manifest). Upon receiving a request from the client, the signal reception device according to the embodiments of the present disclosure acquires a file corresponding to an AI keyword related to the client request using the signaling information (manifest). After receiving the file, the signal reception device according to the embodiments of the present disclosure may selectively decode a sequence according to context identification information (context ID) corresponding to the AI keyword.

The signal reception device according to embodiments of the present disclosure may reference each description box of media data in a file format through AI keywords, and acquire a sequence that satisfies the request from the user based on the context identification information and keyword information contained in each description box.

Referring to step S10020 of FIG. 10, the decoder 3250 of the signal reception device according to embodiments of the present disclosure selectively decodes the sequence that satisfies the request from the user. FIG. 10 illustrates that the decoder 3250 extracts sequence A from an AI keyword of the user and selectively decodes the same. The display 32100 of the signal reception device according to the embodiments of the present disclosure displays the selectively decoded sequence.

Figure 11:
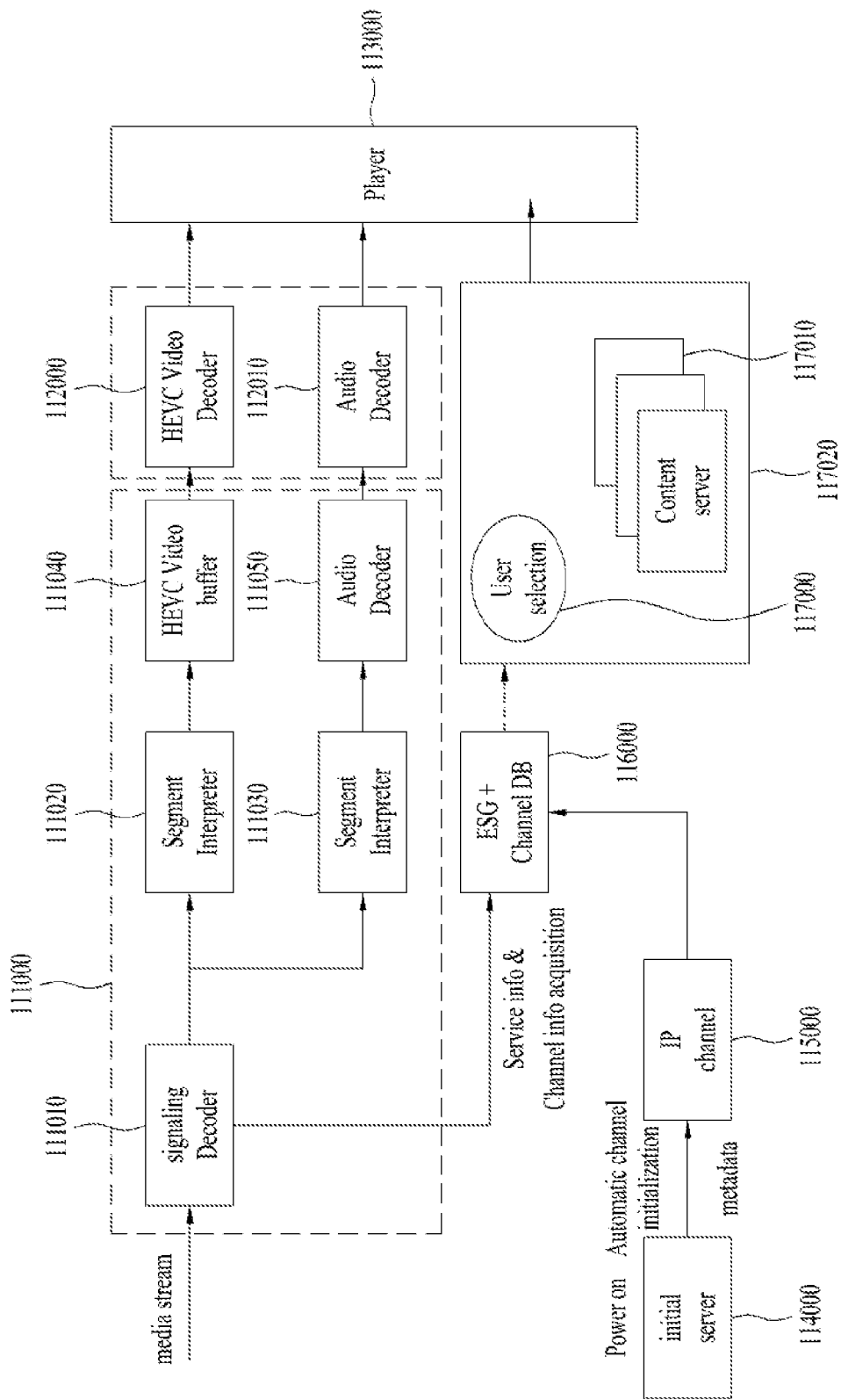
FIG. 11 shows a configuration of a context-based AI media service system.

FIG. 11 shows a configuration of a context-based AI media service system.

A signal reception device according to embodiments of the present disclosure may include a decoder 111000, a player 113000, and a server 117020. The elements in FIG. 11 may be included in the decoder 32050 of FIG. 3 described above.

The decoder 111000 includes a signaling decoder 111010, segment interpreters 111020 and 111030, a video buffer 111040, and an audio buffer 111050.

The signaling decoder 111010 receives media stream data contained in the signal received by the tuner 32010, and decodes signaling information from the media stream data. The signaling decoder 111010 acquires service information and channel information from the media stream data and delivers the same to the database 116000.

The segment interpreter 111020 and the segment interpreter 111030 interpret the video segment and audio segment of media stream data, respectively. The video segment interpreter 111020 delivers video data to the video buffer 111050. The audio segment interpreter 111050 transfers audio data to the audio decoder 111050.

The video buffer 111040 receives the video data from the video segment interpreter 111020 and stores the video data in a buffer. The video buffer 111040 transfers the video data stored in the buffer to the video decoder 112000.

The audio decoder 111050 receives the audio data from the audio segment interpreter 111050 and decodes the audio data.

The video decoder 112000 receives the video data from the video buffer 111040, decodes the video data, and transfers the same to the player 113000.

The audio decoder 112010 receives the audio data from the audio decoder 111050, decodes the audio data, and transfers the same to the player 113000.

The initialization server 114000 stores initialization information required when the power of the reception device is activated. When the power of the reception device is activated, the initialization server 114000 automatically initializes the channel and transfers metadata about the automatic channel initialization to an IP channel 115000.

When the reception device is connected to the IP, the IP channel 115000 provides information about the IP channel to the database 16000. The signal reception device according to embodiments of the present disclosure includes a device to which an IP is connected. When the power of the reception device to which the IP is connected is activated, the signal reception device according to the embodiments of the present disclosure may scan not only the terrestrial channel but also the IP channel. The channel 115000 may also provide information about the IP channel.

The database 116000 receives service information and channel information from the signaling decoder 111010, and receives information about the IP channel from the IP channel 115000. The database 116000 may generate a database for the channel and generate and provide service guide information (Electronic Service Guide (ESG)) for service data of a media stream to a user. The signal reception device according to the embodiments of the present disclosure receives a request for the service data from a user, and receives a media stream corresponding to a channel related to the request.

The database 116000 may store IP channel scanning information in a terrestrial channel database and provide the ESG including a terrestrial channel and an IP channel to the user. When the user selects a channel or service data to be viewed through the ESG (117000), the player 113000 of the signal reception device according to the embodiments of the present disclosure may display, based on user interface (UI)/user experience (UX), services that can be provided.

The server 117020 is a content server 117010 for providing content for user selection 117000. The server 117020 may provide the content to the user in response to a user action by which the user has selected content based on the ESG-related UI/UX.

The context-based AI media service system of FIG. 11 may be included in the system 32000 of FIG. 3 described above.

Figure 12:
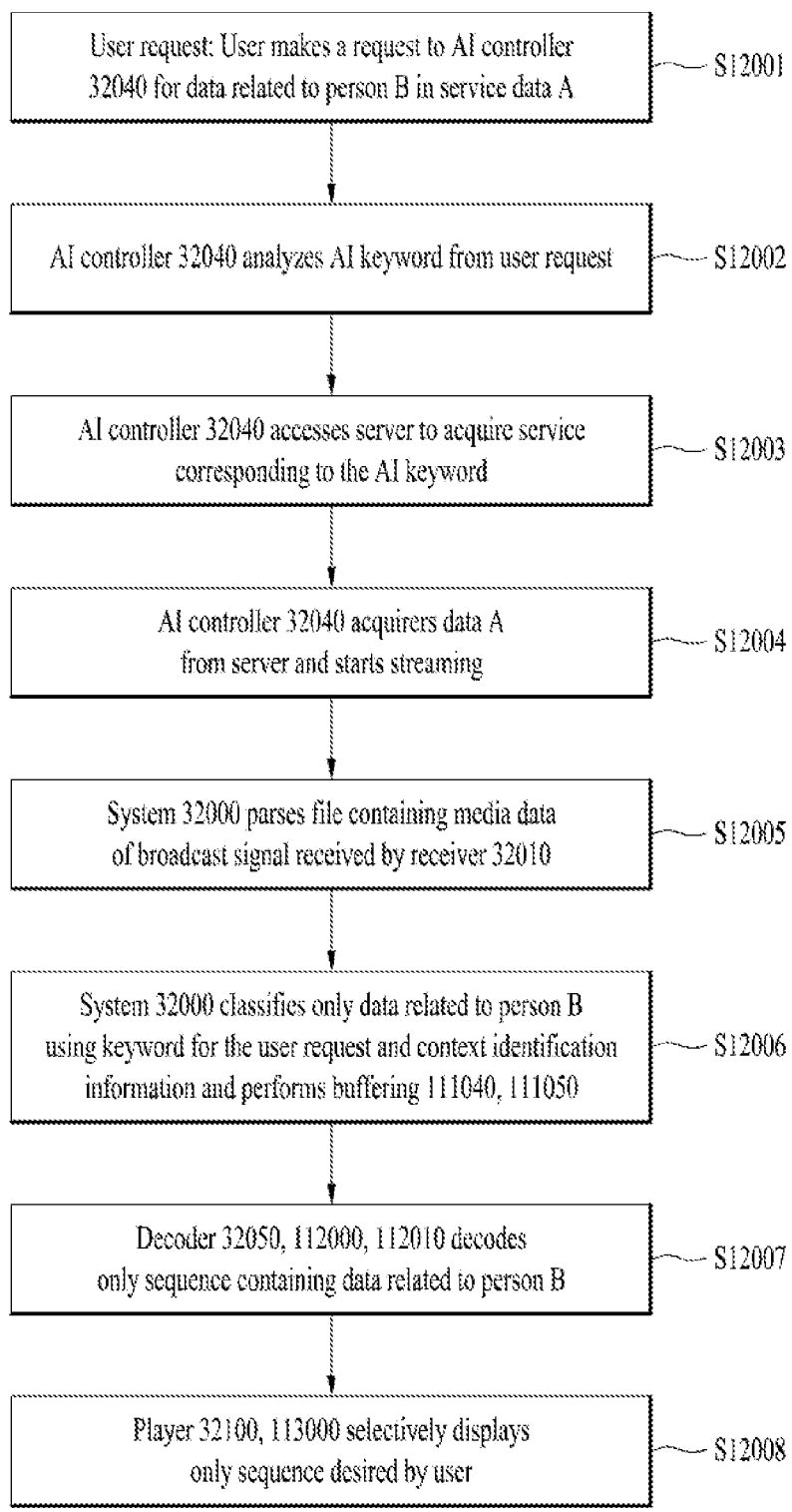
FIG. 12 illustrates a signal reception method according to embodiments of the present disclosure.

FIG. 12 illustrates a reception method according to embodiments of the present disclosure.

Referring to step S12001, the AI controller 32040 receives a user natural language request. The user request includes a context-based natural language request, and includes all of various natural language requests for media data that the user desires to watch. The user may request the AI controller 32040 to show sequence data related to person B appearing in the service data A. The user may request the AI controller 32040 to show a goal-scoring scene of player B in a sports event A. According to embodiments of the present disclosure, the context for the user natural language request is not limited to specific objects such as genre, time, person, place, and appearance element of the service, and may include all contexts related to data contained in the signal. Therefore, the user may be allowed to make a request to the reception device through a natural language without limitation, and the reception device may acquire data related to the context contained in the user request from a signal through AI control and provide the same to the user.

Referring to step S12002, the AI controller 32040 analyzes AI keywords from the natural language including the received user request. The AI controller 32040 extracts a keyword included in the natural language using the AI analysis.

Referring to step S12003, the AI controller 32040 accesses the server to acquire a service corresponding to the AI keyword. Since the service related to the AI keyword corresponds to data that the user desires to watch, the AI controller 32040 accesses the server 117020 to acquire the service related to the AI keyword.

Referring to step S12004, the AI controller 32040 acquires service data A from the server 117020 and starts streaming. In response to the user request to show the goal-scoring scene of player B, the AI controller 32040 needs to acquire service data A containing the goal-scoring scene of player B based on the context of the goal-scoring scene of player B.

Referring to step S12005, the system 32000 parses a file containing media data of a signal received by the tuner 32010. The system 32000 may check the context information about a sample or a sample group for a video sequence by parsing the files of FIGS. 5 to 10 described above, and may check a container for accessing the sample or sample group.

Referring to step S12006, the system 32000 classifies only data related to the goal-scoring scene of player B using keywords for the user request, and the context identification information and keywords included in the file, and stores the same in the buffer 111040. The system 32000 may store video data and audio data in the buffer in order to collect and play only the video sequence requested by the user.

Referring to step S12007, the decoders 32050, 112000, and 112010 decode only a sequence containing data related to the goal-scoring scene of player B.

Referring to step S12008, the players 32100 and 113000 selectively display only the sequence desired by the user. The user may view the desired content through the ESG. The user may check information about the content that is being viewed through the ESG. The signal reception device according to the embodiments of the present disclosure may guide and inform the user, through the display, that the context and keywords are accessible based on the AI natural language. The user may recognize that the media data can be selectively viewed based on the context and keywords, and make a request for a keyword desired by the user to the signal reception device according to the embodiments of the present disclosure. Further, the signal reception device according to the embodiments of the present disclosure may inform the user of context information related to the content, thereby guiding the user to select selective playback.

Once the user send the AI controller 32040 a request message for the content currently being viewed, the user may view only the sequence requested by the user through the above-described process. When the user desires to view a specific sequence related to other content in addition to the content currently being viewed, the user may transmit a request message to the AI controller 32040 in a natural language. The user may selectively or independently view service data for a broadcast network or a broadband network. The signal transmission device or the signal reception device according to the embodiments of the present disclosure may insert the context identification information and the AI keywords in media data and signaling information about the media data, and connect the context identification information and keywords based on the uses the natural language keywords of the user and the AI control technique to provide a specific service desired by the user. The user may select a media service independently and distinguishably. The selective media service provides a model that may divide a single content into a plurality of data so as to be consumed in various ways.

Figure 13:
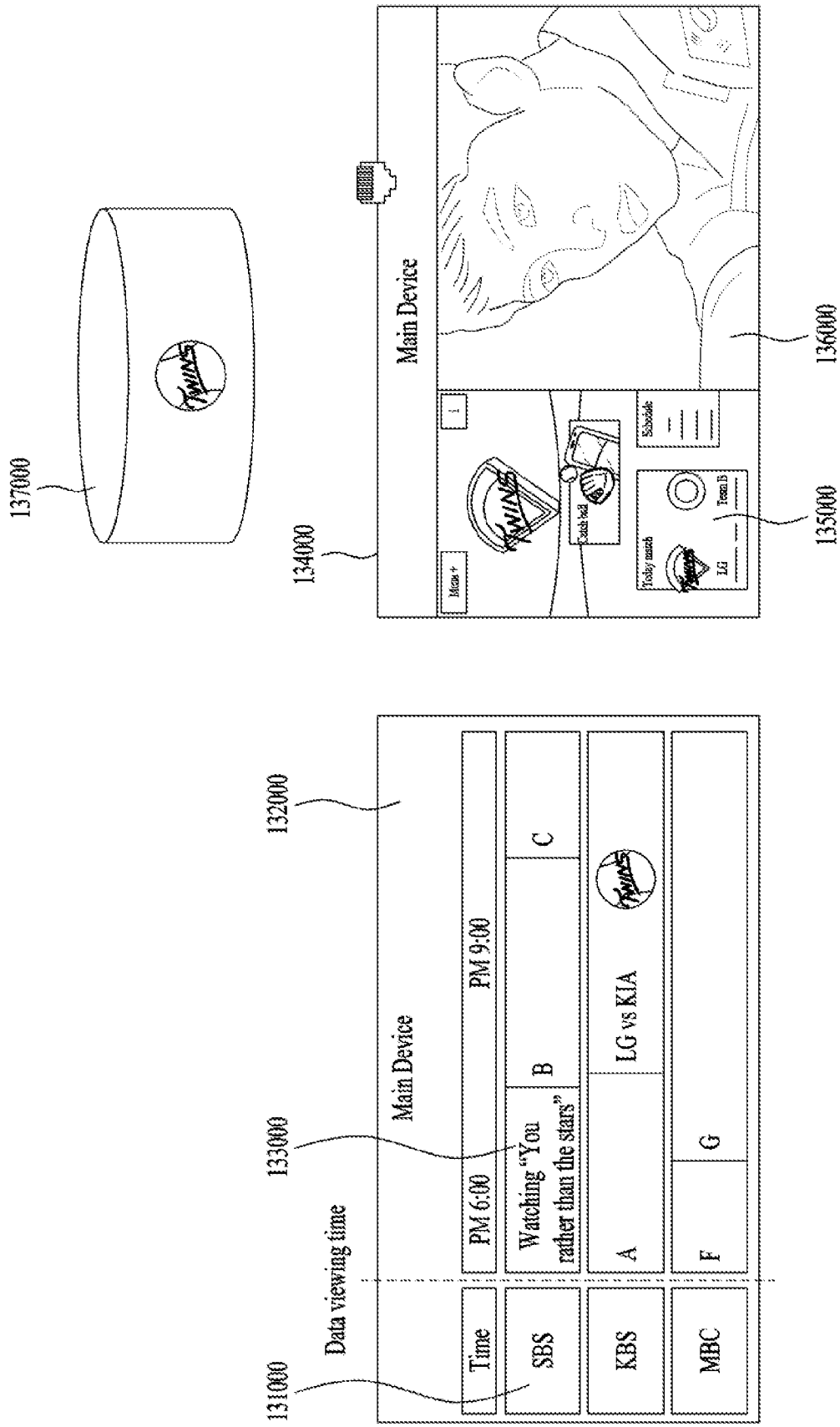
FIG. 13 illustrates a method of providing service guide information by a signal reception device according to embodiments of the present disclosure.

FIG. 13 illustrates a method of providing service guide information by a signal reception device according to embodiments of the present disclosure.

The signal reception device according to the embodiments of the present disclosure may display content 134000 through a player 113000. The main device 134000 may correspond to the player 113000, and may be referred to as a displayer or the like.

The signal reception device according to the embodiments of the present disclosure may display service guide information (ESG) 133000 on the main device. The service guide information 133000 may indicate information 133000 about the content contained in each channel 131000 based on a time 132000. The service guide information 133000 may indicate content that may be viewed on each channel based on the current viewing time, as shown in FIG. 13. The service guide information 133000 may be displayed on the main device or a second device. The service guide information 133000 may be displayed on the full screen or a partial screen of the main device.

While currently viewed content 36000 is being played on the main device 134000, information 135000 about the content of a channel other than the currently viewed channel may also be displayed on the main device 134000. The user may provide, by voice, the AI controller 32040 with a natural language request to show other content related to person A 136000 appearing in the content currently being viewed. The user may check the service guide information 133000 or the information 135000 about the content of a channel other than the channel currently being viewed, and thus may make a request to the AI controller 32040 by voice to inform that the user wants to view second content 135000. Furthermore, for example, when the second content 135000 is a sports event content, the user may make a request to the AI controller 32040 to inform that the user desires to view videos of events of sports team B held in a certain period. Alternatively, the user may make a request to the AI controller 32040 by voice to inform that the user wants to view scene D of player C belonging to sports team B. In this case, the AI controller 32040 may extract keywords such as person A, sports team B, player C, and scene D from the user's natural language, and provide an AI-based media service to the user through the above-described process based on context information such as the keywords. When necessary, the AI controller 32040 may access the server 137000, 117020 to acquire content related to a keyword requested by the user.

Figure 14:
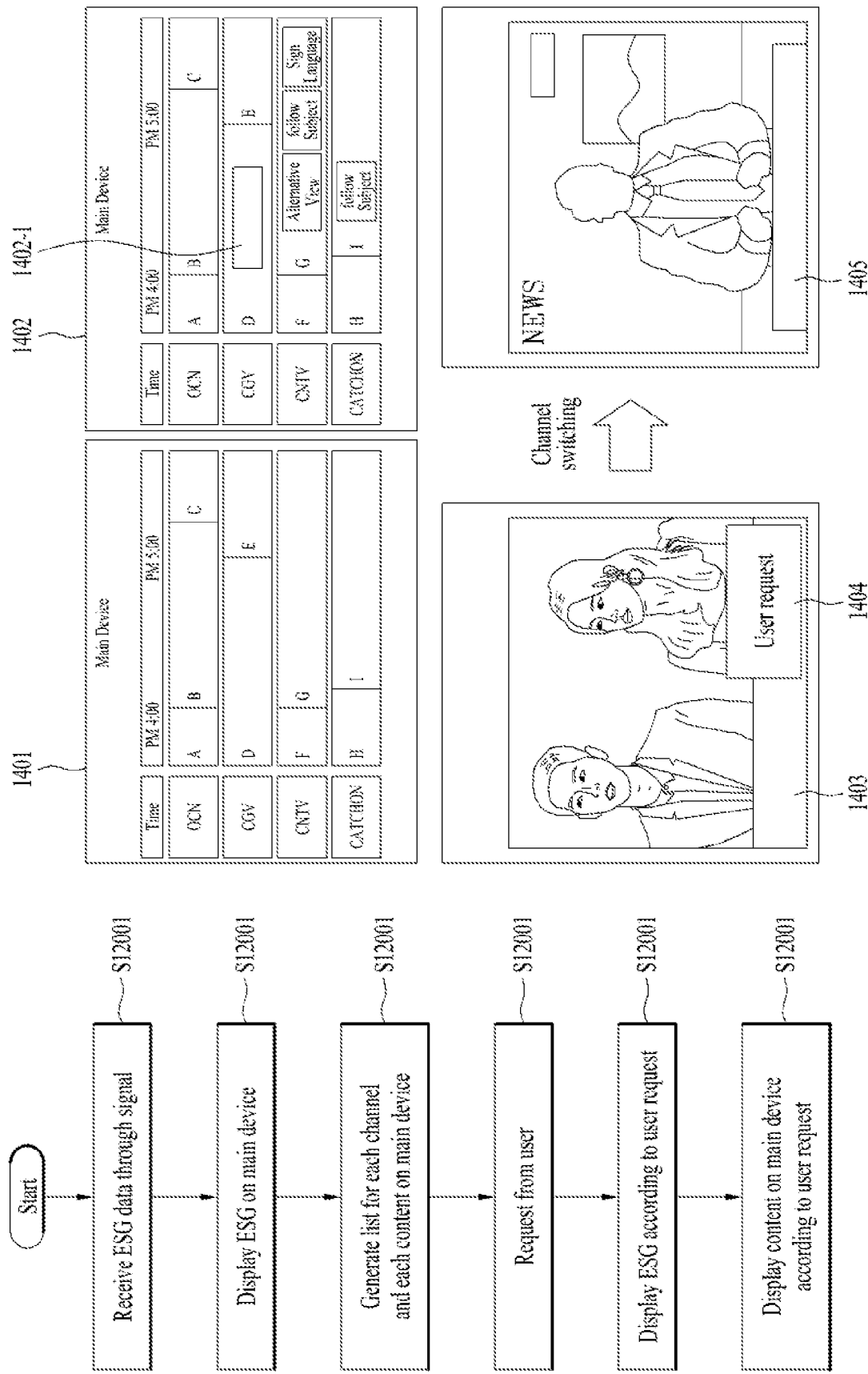
FIG. 14 illustrates a method of receiving a user request by a signal reception device according to embodiments of the present disclosure.

FIG. 14 illustrates a method of receiving a user request by a signal reception device according to embodiments of the present disclosure.

The signal reception device according to the embodiments of the present disclosure receives a signal containing ESG data (S14001).

The signal reception device displays the ESG data on a main device (S14002).

The signal reception device generates a list for each channel and each content and displays the same on the main device (S14003). The ESG data may be displayed on the entirety or part of the main device (or the display screen) for each channel, time and content as described above. With regard to displaying the ESG data, the signal reception device according to embodiments of the present disclosure may display, on the display screen, service data that may be viewed for each channel, time, and content (1401). The signal reception device according to the embodiments of the present disclosure may display information on components on the display screen according to each component constituting the service data (1402). In the present specification, a component may represent a meaning including a video component, an audio component, a closed caption component, and an application component that the constitute service data. The signal reception device according to embodiments of the present disclosure may display context information related to the service data on the display screen (1402-1).

The signal reception device receives a request from the user (S14004). The user selectively and independently may make a request to the signal reception device according to embodiments of the present disclosure for a sequence including a specific person to be viewed, a sequence including a specific scene, a sequence including a specific time, a sequence including a specific video, a sequence including a specific audio, a sequence related to a specific application, a sequence including a specific closed caption, and the like, with reference to the information on the displayed context information and component information.

The controller 32040 may control and display information for helping the user's AI request. The user's AI request is not limited to the information displayed in relation to the ESG data. The user may send the controller 32040 a request related to data to be viewed through a natural language.

The signal reception device may display ESG data related to the user request (S14005). In the operation 1401, 1402 of displaying the ESG data received by the signal reception device, the ESG data related to the user request may be displayed. The signal reception device according to the embodiments of the present disclosure may provide information related to the AI service to the user through a partial area 1404 of the display screen. The partial area 1404 may be displayed on the display screen by adjusting the position, size, and the like thereof. The partial area 1404 may include lists 1401 and 1402 representing context-related information for the above-described ESG data and AI service. The partial area 1404 may display an AI service start guide message to the user. The controller 32040 may analyze the natural language included in the user request and display a context for the analysis result through the partial area 1404.

The signal reception device according to the embodiments of the present disclosure displays content on the display screen of the main device according to the user request (S14006). The user may view specific sequence data contained in one content. The user may view specific sequence data contained in a plurality of contents.

Figure 15:
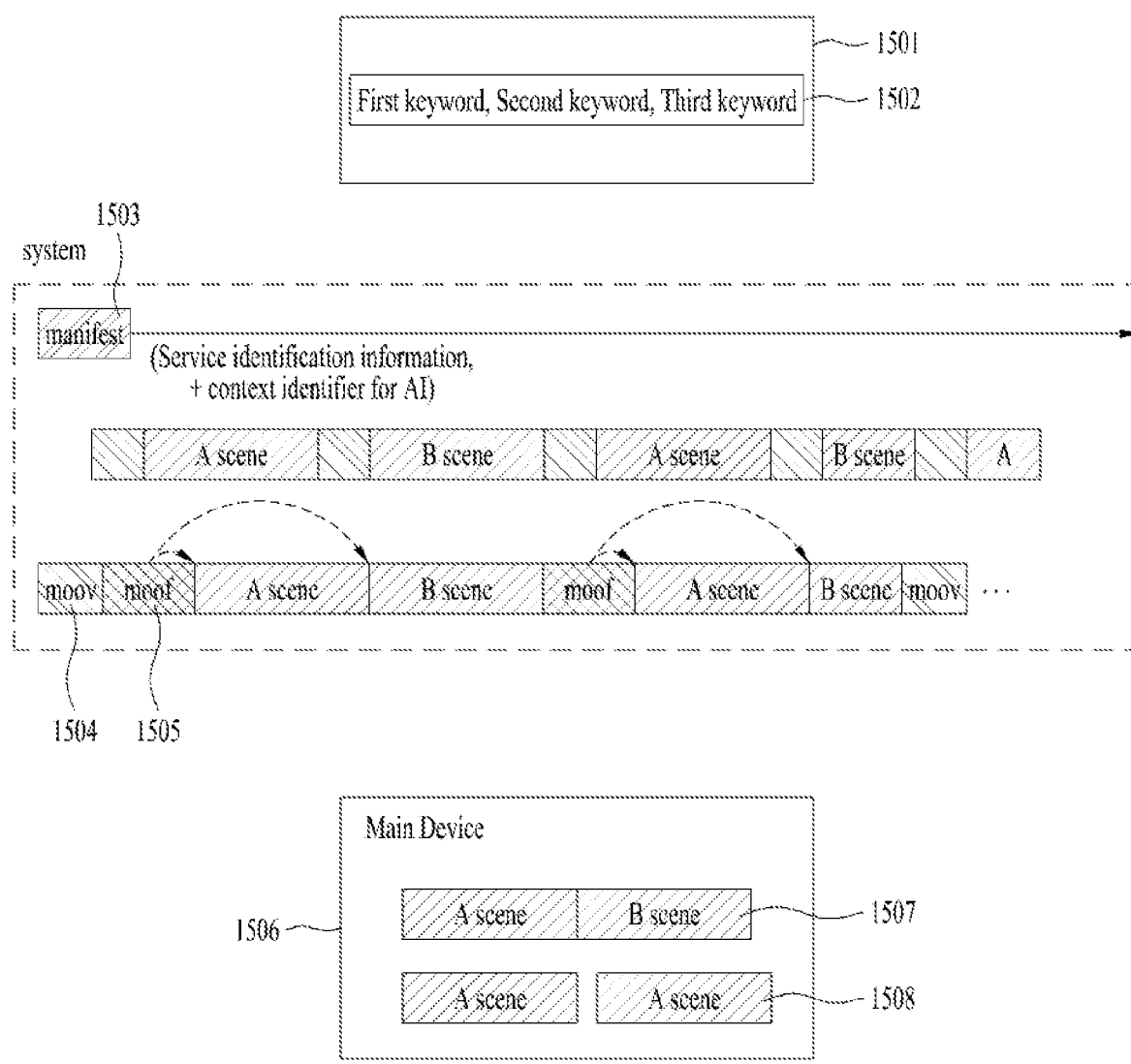
FIG. 15 illustrates a method of performing AI control by a signal reception device by receiving a user request according to embodiments of the present disclosure.

FIG. 15 illustrates a method of performing AI control by a signal reception device by receiving a user request according to embodiments of the present disclosure.

The signal reception device according to the embodiments of the present disclosure may guide the AI control process for the user through the area 1404 on the display screen. The display area 1404 of FIG. 14 may correspond to the display information 1501 of FIG. 15. The controller 32040 may understand and analyze the user's natural language. The controller 32040 may manage data about analysis of a human natural language based on big data. The controller 32040 may extract keywords by analyzing the context of the user's natural language. The controller 32040 may extract one or more keywords 1502 and display the same in the display area 1404.

The system 32000 of the signal reception device according to the embodiments of the present disclosure receives a signal. The receiver 32010 of the system 32000 transfers the received signal to the parser including the file parser 32020 and the signaling parser 32030. The parser parses the signaling information 1503 contained in the signal. The signaling information 1503 includes information for scanning and acquiring a service. Through the signaling information 1503, the signal reception device may access and decode desired service data among a plurality of service data contained in the signal. The signaling information 1503 includes context identification information and keyword information related to the context information about service data. The controller 32040 compares the keyword 1502 acquired from the context of the user request information with the context identification information and keyword information in the signaling information 1503 to determine whether there is a service matching the context desired by the user. The controller 32040 identifies the service 1504 that matches the context desired by the user, and accesses the service data 1504. The controller 32040 controls the parser to parse the file format 1504 of the service data. The service data 1504 includes a box or container containing signaling information about the context. The file parser 32020 receives signaling information about the context from the signaling parser 32030 or keyword information from the controller 32040 and parses a data sequence related to the context desired by the user included in the service data 1504. The decoder 32050 selectively decodes the data sequence. The player 113000 displays the data sequence.

The controller 32040 controls the player 113000 to display, on the main device 1506, specific sequences 1507 and 1508 contained in the service data 1504 accessed based on the signaling information 1503. The controller may access a sample for a sequence or a sample group including the sequence through the context identification information and the keyword information included in the description (box or container) described above with reference to FIGS. 7 and 9. The signal reception device according to the embodiments of the present disclosure may display a sequence including A scene data and B scene data related to a user's keyword, or a sequence including a plurality of A scenes, as shown in FIG. 15.

Figure 16:
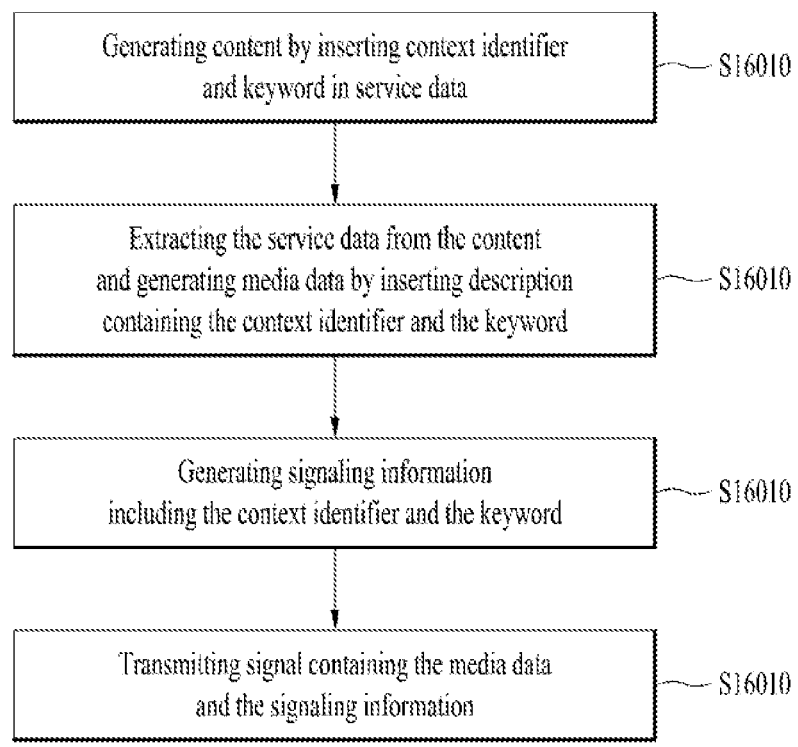
FIG. 16 illustrates a signal transmission method according to embodiments of the present disclosure.

FIG. 16 illustrates a signal transmission method according to embodiments of the present disclosure.

Regarding step S16010, a signal transmission method according to embodiments of the present disclosure includes generating content by inserting a context identifier and a keyword in service data. The operation of generating the content is performed by the production 30110, and the specific generation method is described above with reference to FIGS. 3 and 4.

Regarding step S16010, the signal transmission method according to the embodiments of the present disclosure includes extracting the service data from the content, and generating media data by inserting a description containing the context identifier and the keyword. The operation of generating the media data is performed by the system 30200 or the file generator 30220 of the system 30200, and the specific generation method is described above with reference to FIGS. 3 and 5.

Regarding step S16010, the signal transmission method according to the embodiments of the present disclosure includes generating signaling information including the context identifier and the keyword. The operation of generating the signaling information is performed by the system 30200 or the signaling information generator 30230, and a specific generation method is described above with reference to FIGS. 3 and 5 to 9.

Regarding step S16010, the signal transmission method according to the embodiments of the present disclosure includes transmitting a signal containing the media data and the signaling information. The operation of transmitting the signal is performed by the system 30200 or the transmitter 30240. The signal transmission method according to the embodiments of the present disclosure may include modulating a signal using orthogonal frequency division multiplex (OFDM).

Figure 17:
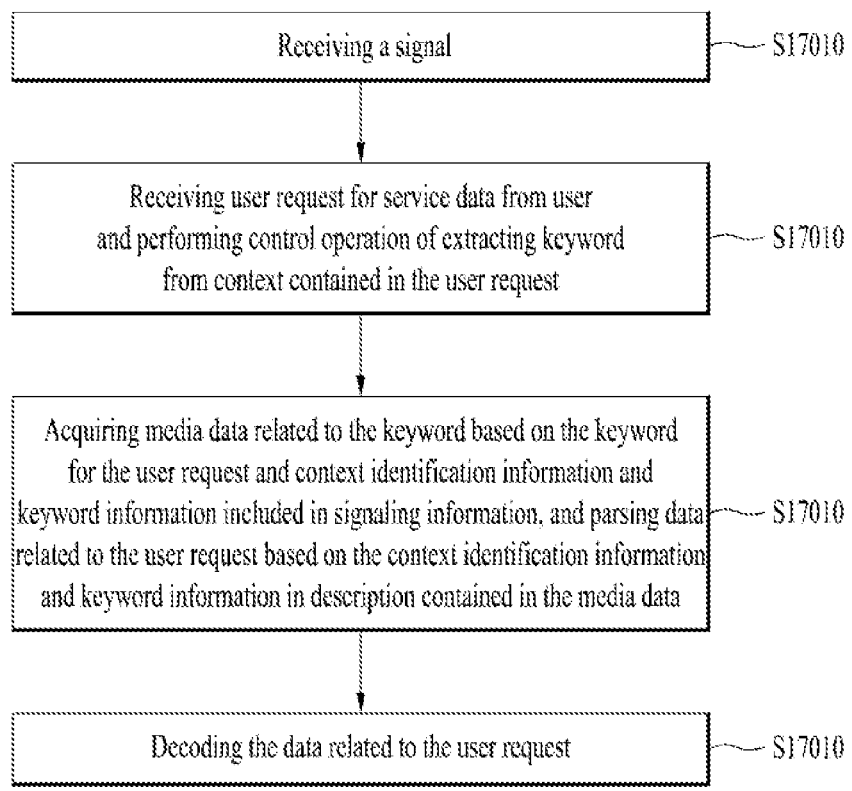
FIG. 17 illustrates a signal reception method according to embodiments of the present disclosure.

FIG. 17 illustrates a signal reception method according to embodiments of the present disclosure.

Regarding step S17010, the signal reception method according to the embodiments of the present disclosure includes receiving a signal. The signal is received by system 32000 or receiver 32010. The signal reception method according to the embodiments of the present disclosure may include detecting a signal for channel synchronization and demodulating the signal using OFDM, which is a reverse operation of modulation.

Regarding step S17010, the signal reception method according to the embodiments of the present disclosure includes receiving a user request for service data from a user, and extracting a keyword from a context contained in the user request. The controller 32040 receives the user request, analyzes the user request using the AI scheme, and extracts the keyword. The specific process of receiving the user request is described above with reference to FIGS. 3 and 10.

Regarding step S17010, the signal reception method according to the embodiments of the present disclosure includes acquiring media data related to the keyword based on the keyword for the user request and context identification information and keyword information included in signaling information, and parsing data related to the user request based on the context identification information and keyword information in the description included in the media data. The signaling information parser 32030 parses the service identification information, context information, and keyword information included in the signaling information. The file parser 32020 parses the description contained in the media data. The process of parsing or decoding the media data and the signaling information is described above with reference to FIGS. 6 to 11.

Regarding step S17010, the signal reception method according to the embodiments of the present disclosure includes decoding the data related to the user request. The decoding operation is performed by the system 32000 or the decoder 32050. The specific process of decoding the data is described above with reference to FIGS. 12 to 15.

In this specification, modules or units may be processors that execute successive procedures stored in a memory (or storage unit). Each of the operations described in the above-described embodiments may be performed by hardware, software, or processors. Each module/block/unit described in the above-described embodiments may operate as a hardware element, a software element, or a processor. In addition, the methods disclosed in the present disclosure may be executed as code. The code may be written in a recoding medium readable by a processor, and thus may be read by the processor provided by an apparatus.

Although the drawings have been described separately for the sake of convenience of explanation, it is also possible to design a new embodiment to be implemented by combining the embodiments described in each drawing. It is also within the scope of the present disclosure to design a computer-readable recording medium in which a program for executing the previously described embodiments is recorded according to the needs of those skilled in the art.

The apparatuses and methods according to the present disclosure are not limited to the configurations and methods of the embodiments described above. The above-described embodiments may be configured such that various modifications can be made by selectively combining all or some of the embodiments.

The methods according to the present disclosure may be implemented with processor-readable code in a processor-readable recording medium provided to a network device. The processor-readable medium includes all kinds of recording devices capable of storing data readable by a processor. Examples of the processor-readable medium include ROM, RAM, CD-ROM, magnetic tapes, floppy disks, and optical data storage devices, and also include carrier-wave type implementation such as transmission over the Internet. In addition, the processor-readable recording medium may be distributed over network-connected computer systems such that code readable by the processor in a distributed fashion may be stored and executed.

While the present disclosure has been particularly shown and described with reference to exemplary embodiments thereof, it is to be understood that the disclosure is not limited to the disclosed exemplary embodiments. It will be understood by those skilled in the art that various modifications and variations can be made in the present disclosure without departing from the spirit and scope of the present disclosure. These modifications should not be understood individually from the technical idea or perspective of the present disclosure.

Both apparatus and method inventions are discussed in this specification and descriptions of both of the apparatus and method inventions may be complementarily applicable to each other as necessary.

It will be understood by those skilled in the art that various changes and modifications can be made in the present disclosure without departing from the spirit or scope of the disclosure. Thus, it is intended that the present disclosure cover the modifications and variations of this disclosure provided they come within the scope of the appended claims and their equivalents.

Both apparatus and method inventions are discussed in this specification and descriptions of both of the apparatus and method inventions may be complementarily applicable to each other.

MODE

Various embodiments have been described in the best mode.

INDUSTRIAL APPLICABILITY

The present disclosure is available in the field of signal provision including a series of data.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A signal transmission method comprising:
generating content, including service data, and inserting a context identifier and a keyword for the service data ahead of the service data based on a context timeline for the content;
extracting the service data from the content and generating media data by inserting a description including the context identifier and the keyword;
generating signaling information including the context identifier and the keyword; and
transmitting a signal containing the media data and the signaling information,
wherein the description further includes grouping information for one or more contexts, and
wherein the grouping information includes a group index for identifying the contexts and a number of context sequences that are grouped.

2. The method of claim 1, wherein the context identifier and the keyword represent context information about the service data.

3. The method of claim 1, wherein the media data comprises a container containing metadata about the service data included in the media data, the container containing a description indicating the context identifier and the keyword,
wherein the container is positioned ahead of the media data.

4. A signal transmission apparatus comprising:
a first generator configured to generate content, including service data, and inserting a context identifier and a keyword for the service data ahead of the service data based on a context timeline for the content;
a second generator configured to extract the service data from the content and generate media data by inserting a description including the context identifier and the keyword;
a third generator configured to generate signaling information including the context identifier and the keyword; and
a transmitter configured to transmit a signal containing the media data and the signaling information,
wherein the description further includes grouping information for one or more contexts, and
wherein the grouping information includes a group index for identifying the contexts and a number of context sequences that are grouped.

5. The apparatus of claim 4, wherein the context identifier and the keyword represent context information about the service data.

6. The apparatus of claim 4, wherein the media data comprises a container containing metadata about the service data included in the media data, the container containing a description indicating the context identifier and the keyword,
wherein the container is positioned ahead of the media data.

7. A signal reception method comprising:
receiving a signal containing media data and signaling information,
wherein the media data comprises service data for a content and contains a description containing a context identifier and a keyword about the service data, and the signaling information comprises the context identifier and the keyword,
wherein the context identifier and the keyword are inserted ahead of the service data based on a context timeline for the content;
receiving a user request for the service data from a user and performing a control operation of extracting a keyword from a context contained in the user request;
acquiring media data related to the keyword based on the keyword for the user request and the context identification information and keyword information included in the signaling information;
parsing data related to the user request based on the context identification information and keyword information in the description contained in the media data; and
decoding the data related to the user request,
wherein the description further includes grouping information for one or more contexts, and
wherein the grouping information includes a group index for identifying the contexts and a number of context sequences that are grouped.

8. The method of claim 7, wherein the context identifier and the keyword represent context information about the service data.

9. The method of claim 7, wherein the media data comprises a container containing metadata about the service data included in the media data, the container containing a description indicating the context identifier and the keyword,
wherein the container is positioned ahead of the media data.

10. The method of claim 7, wherein performing of the control operation comprises:
displaying information indicating the keyword of the user request on a display screen; and
displaying, in response to a user input signal, a sequence containing data related to the user request on the display screen.

11. A signal reception apparatus comprising:
a tuner configured to receive a signal containing media data and signaling information,
wherein the media data comprises service data for a content and contains a description containing a context identifier and a keyword about the service data, and the signaling information comprises the context identifier and the keyword,
wherein the context identifier and the keyword are inserted ahead of the service data based on a context timeline for the content;
a controller configured to receive a user request for the service data from a user and extract a keyword from a context contained in the user request;
a parser configured to:
acquire media data related to the keyword based on the keyword for the user request and the context identification information and keyword information included in the signaling information; and
parse data related to the user request based on the context identification information and keyword information in the description contained in the media data; and
a decoder configured to decode the data related to the user request,
wherein the description further includes grouping information for one or more contexts, and wherein the grouping information includes a group index for identifying the contexts and a number of context sequences that are grouped.

12. The apparatus of claim 11, wherein the context identifier and the keyword represent context information about the service data.

13. The apparatus of claim 11, wherein the media data comprises a container containing metadata about the service data included in the media data, the container containing a description indicating the context identifier and the keyword, wherein the container is positioned ahead of the media data.

14. The apparatus of claim 11, wherein the controller is configured to:

display information indicating the keyword of the user request on a display screen; and display, in response to a user input signal, a sequence containing data related to the user request on the display screen.

* * * * *